United States Patent
Takahashi et al.

(10) Patent No.: US 6,393,152 B2
(45) Date of Patent: May 21, 2002

(54) HIERARCHICAL IMAGE DECODING APPARATUS AND MULTIPLEXING METHOD

(75) Inventors: Toshiya Takahashi, Ibarakishi; Kenichi Takahashi, Kyotoshi, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/039,491

(22) Filed: Mar. 16, 1998

(30) Foreign Application Priority Data

Mar. 17, 1997 (JP) .............................. 9-062663

(51) Int. Cl.[7] .............................. G06K 9/36; G06K 9/46
(52) U.S. Cl. ............. 382/233; 375/240.12; 375/240.25; 382/236; 382/238
(58) Field of Search ................................ 382/232, 233, 382/236, 238, 240, 248, 250; 348/397, 412, 408, 415; 358/261.2, 430, 432; 375/240.12, 240.25

(56) References Cited

U.S. PATENT DOCUMENTS

| | | | |
|---|---|---|---|
| 5,031,053 A | * 7/1991 | Chamzas et al. | ............ 358/426 |
| 5,410,307 A | * 4/1995 | Hekstra et al. | ................ 341/50 |
| 5,414,469 A | 5/1995 | Gonzales et al. | ............ 348/408 |
| 5,585,852 A | * 12/1996 | Agarwal | ....................... 348/398 |
| 5,828,788 A | * 10/1998 | Chiang et al. | ............... 382/239 |
| 5,832,124 A | * 11/1998 | Sato et al. | .................... 382/238 |
| 5,894,518 A | * 4/1999 | Shiojiri | .................... 348/400.1 |

FOREIGN PATENT DOCUMENTS

JP 9-37260 2/1997 ............ H04N/7/32

* cited by examiner

*Primary Examiner*—Timothy M. Johnson
(74) *Attorney, Agent, or Firm*—Parkhurst & Wendel, L.L.P.

(57) ABSTRACT

A hierarchical coding apparatus comprising first and second compressive coding units for subjecting high- and low-resolution digital image signals to hierarchical coding to generate high- and low-resolution coded data, and a resolution conversion circuit for subjecting a portion of low-resolution decoded image signal obtained by decoding the low-resolution coded data to resolution conversion, wherein only the resolution converted image signal is used as a reference signal for a low resolution side in coding the high-resolution digital image signal, thereby making the reduction of compression efficiency of image data, which is transmitted or stored, less, and simplifying the configuration of the hierarchical coding apparatus.

7 Claims, 16 Drawing Sheets

Eg1 : Bit stream of high-resolution image

Eg2 : Bit stream of low-resolution image

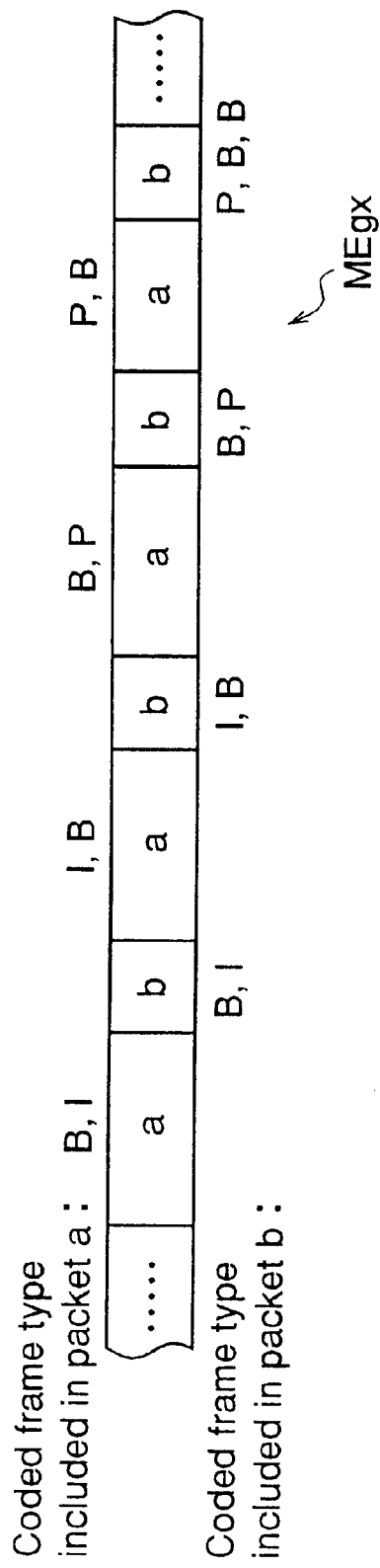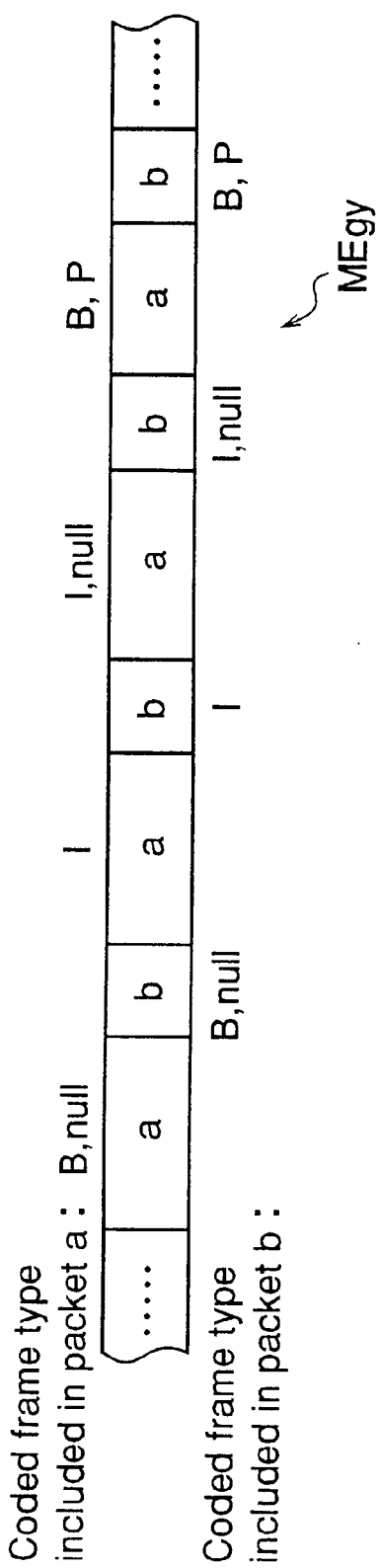

Eg1 : bit stream of high-resolution image

Eg2 : bit stream of low-resolution image

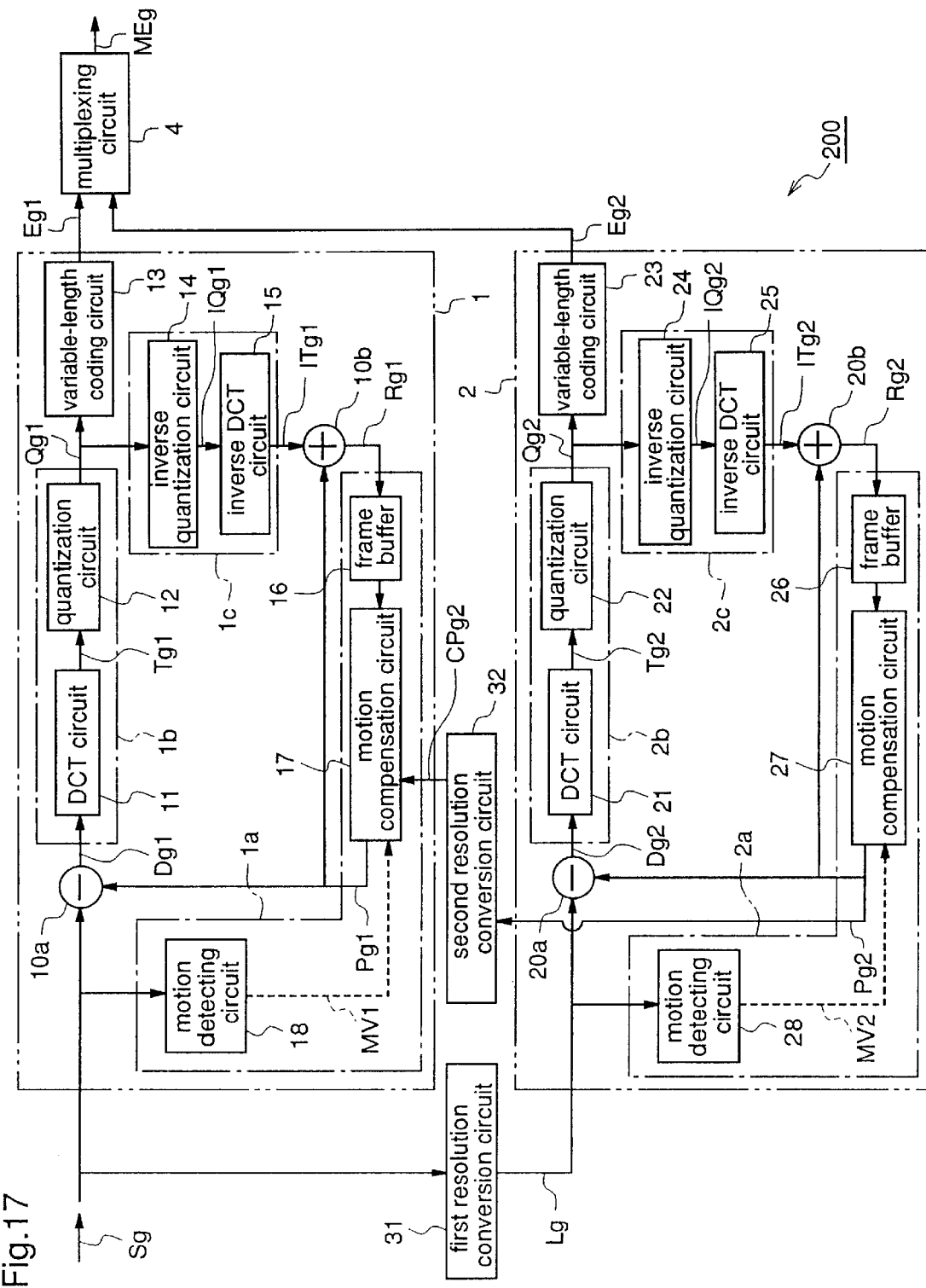

though the present invention relates to a hierarchical image processing apparatus, a hierarchical image processing method, and a data storage medium, and more particularly, to a reduction of the amount of operational processing in a processing for compressively coding digital image signals having different resolutions and in a processing for multiplexing streams obtained by compressively coding image signals having different resolutions and storing or transmitting the multiplexed streams.

HIERARCHICAL IMAGE DECODING APPARATUS AND MULTIPLEXING METHOD

FIELD OF THE INVENTION

The present invention relates to a hierarchical image processing apparatus, a hierarchical image processing method, and a data storage medium, and more particularly, to a reduction of the amount of operational processing in a processing for compressively coding digital image signals having different resolutions and in a processing for multiplexing streams obtained by compressively coding image signals having different resolutions and storing or transmitting the multiplexed streams.

Further, the present invention relates to a data storage medium for storing the multiplexed stream obtained by multiplexing the streams, and a data storage medium for storing a program which realizes, by software, the compressive coding or multiplexing that can reduce the amount of operational processing.

BACKGROUND OF THE INVENTION

As a digital image signal has huge amount of information, high coding efficiency is inevitably required to transmit or recording it. Recently, various image compressive coding techniques have been proposed, among which there is a technique carrying out hierarchical image coding which is being developed.

This technique carrying out hierarchical image coding is a method which subjects the digital image signal to compressive coding so that the user can obtain digital image signals such as the spatial-resolution image and temporal-resolution image having different resolutions from a kind of a bit stream. Such a hierarchical image coding method, for example, carries out compressive coding to the digital image data of High Definition Television (HDTV) and to the digital image data of Standard Definition Television (SDTV) simultaneously, relating them, and combines each coded image data having a different resolution to be transmitted. By this method, it is possible to regenerate digital image signal having the resolution, which the user requires, by decoding the corresponding coded image data.

A MPEG-based hierarchical image coding, which is an example of the foregoing conventional hierarchical image coding, is explained referring to figures, as follows.

FIG. 17 is a block diagram for explaining a conventional MPEG-based hierarchical coding apparatus.

This hierarchical coding apparatus 200 comprises a first compressive coding unit 1, a first resolution conversion circuit 31 and a second compressive coding unit 2. The first compressive coding unit 1 compressively codes an input digital image signal Sg. The first resolution conversion circuit 31 subjects the digital image signal Sg to resolution conversion in a way that its resolution is made a half both in the horizontal and vertical directions, to output a low-resolution image signal Lg. The second compressive coding unit 2 compressively codes the low-resolution image signal Lg. Before being input to the hierarchical coding apparatus 200, the digital image signal Sg is divided into frames, and each frame is divided into coding units which are two-dimensional blocks of prescribed size.

The second compressive coding unit 2 comprises a predictive processing unit 2a, a subtraction processing unit 20a, an information compression unit 2b, i.e., compressive coding means, and a variable-length coding unit 23. The predictive processing unit 2a receives the low-resolution image signal Lg and generating predicted data Pg2 corresponding to the data of portion of low-resolution image signal Lg that is a target of coding (hereinafter referred to as target processing data). The subtraction processing unit 20a outputs either the difference between the target processing data and the predicted data Pg2, or the target processing unit as it is, depending on a coding mode of the digital image signal Sg. The information compression unit 2b subjects an output Dg2 of the subtraction processing unit 20a to information compression and outputs compressed data Qg2. The variable-length coding unit 23 subjects the output Qg2 of the information compression unit 2b to variable-length coding and outputs coded image data Eg2 (hereinafter referred to as low-resolution coded data).

In this case, the information compression unit 2b comprises a DCT circuit 21 and a quantization circuit 22. The DCT circuit 21 subjects the output data Dg2 of the subtraction processing unit 20a to the Discrete Cosine Transform (DCT) which transforms data in spatial region to data in frequency region, and outputs a DCT coefficient Tg2. The quantization circuit 22 quantizes the DCT coefficient Tg2 output from the DCT circuit 21 and outputs a quantization coefficient Qg2.

Further, the second compressive coding unit 2 comprises an information expansion unit 2c, i.e., decompressive decoding means, and an addition processing unit 20b. The information expansion unit 2c subjects the quantization coefficient Qg2 output from the information compression unit 2b to information expansion and outputs expanded data ITg2. The addition processing unit 20b outputs either restored data Rg2 resulting from adding the expanded data ITg2 and the predicted data Pg2, or the expanded data ITg2 as it is as restored data Rg2, depending on a coding mode of the digital image signal Sg. The information expansion unit 2c comprises an inverse quantization circuit 24 for inversely quantizing the Qg2 output from the information compression unit 2b, and an inverse DCT circuit 25 for subjecting the IQg2 output from the inverse quantization unit 24 to the inverse DCT that transforms data in frequency region to data in spatial region, and outputting the expanded data ITg2.

Further, the predictive processing unit 2a comprises a frame buffer 26, a motion detecting circuit 28 and a motion compensation circuit 27. The frame buffer 26 stores the restored Rg2 output from the addition processing unit 20b. The motion detecting circuit 28 calculates a motion vector MV2 corresponding to the target processing data. The motion compensation circuit 27 obtains the predicted data Pg2 corresponding to the target processing data from the image data stored in the frame buffer 26, based on the motion vector MV2 from the motion detecting circuit 28. The hierarchical coding apparatus 200 further comprises a second resolution conversion circuit 32 for converting the predicted data Pg2 in a way to make its resolution equal to the resolution of the digital image signal Sg. The output CPg2 of the second resolution conversion circuit 32 (hereinafter referred to as resolution converted predicted data) is output to the first compressive coding unit 1.

The first compressive coding unit 1 has almost the same configuration as the second compressive coding unit 2.

That is, the first compressive coding unit 1 comprises a predictive processing unit 1a, a subtraction processing unit 10a, an information compression unit 1b, i.e., compressive coding means, and a variable-length coding unit 13. The predictive processing unit 1a receives the digital image signal Sg as a high-resolution image signal and generates predicted data Pg1 corresponding to the data of portion of high-resolution image signal Sg that is a target of coding (hereinafter referred to as target processing data). The subtraction processing unit 10a outputs either the difference between the target processing data and the predicted data Pg1, or the target processing unit as it is, depending on a coding mode of the digital image signal Sg. The information compression unit 1b subjects an output Dg1 of the subtraction processing unit 10a to information compression and outputs compressed data Qg1. The variable-length coding unit 13 subjects the output Qg1 of the information compression unit 1b to variable-length coding and outputs coded image data Eg1 (hereinafter referred to as high-resolution coded data).

In this case, the information compression unit 1b comprises a DCT circuit 11 and a quantization circuit 12. The DCT circuit 11 subjects the output data Dg1 of the subtraction processing unit 10a to DCT and outputs a DCT coefficient Tg1. The quantization circuit 12 quantizes the DCT coefficient Tg1 output from the DCT circuit 11 and outputs a quantization coefficient Qg1.

Further, the first compressive coding unit 1 comprises an information expansion unit 1c, i.e., decompressive decoding means, and an addition processing unit 10b. The information expansion unit 1c subjects the quantization coefficient Qg1 output from the information compression unit 1b to information expansion and outputs expanded data ITg1. The addition processing unit 1b outputs either restored data Rg1 resulting from adding the expanded data ITg1 and the predicted data Pg2, or the expanded data ITg1 as it is as restored data Rg1, depending on a coding mode of the digital image signal Sg. The information expansion unit 1c comprises an inverse quantization circuit 14 for inversely quantizing the Qg1 output from the information compression unit 1b, and an inverse DCT circuit 15 for subjecting the IQg1 output from the inverse quantization unit 14 to inverse DCT and outputting the expanded data ITg1.

Further, the predictive processing unit 1a comprises a frame buffer 16, a motion detecting circuit 18 and a motion compensation circuit 17. The frame buffer 16 stores the restored Rg1 output from the addition processing unit 10b. The motion detecting circuit 18 calculates a motion vector MV1 corresponding to the target processing data. The motion compensation circuit 17 obtains the predicted data Pg1 corresponding to the target processing data from the image data stored in the frame buffer 16 and the resolution converted predicted data CPg2 which is the output of the second image conversion circuit 32, based on the motion vector MV1 from the motion detecting circuit 18.

The hierarchical coding apparatus 200 further comprises a multiplexing circuit 4 for multiplexing the high-resolution coded data Eg1 output from the first compressive coding unit 1 and the low-resolution coded data Eg2 output from the second compressive coding unit 2 and outputting a multiplexed bit stream MEg.

The operation is described as follows.

When the hierarchical coding apparatus 200 receives the digital image signal Sg as it is separated into the frame units, as a video signal, initially, the first resolution conversion circuit 31 subjects the image signal Sg to resolution conversion in a way to make its vertical and horizontal resolutions a half of the respective original resolutions, and outputs the low-resolution image signal Lg. Thereafter, the low-resolution image signal Lg is subjected to coding in the second compressive coding unit 2.

To be specific, in the low-resolution image signal Lg, for its intra-frame coding frames (hereinafter referred to as I frames), such as a first frame, which are targets of coding, each target processing data is subjected to intra-frame coding frame coding without calculating the difference between the target processing data which is a coding unit in the I frame, and the predicted data.

That is, in the DCT circuit 21 the low-resolution image signal Lg is subjected to DCT for each target processing data corresponding to the two-dimensional block to be transformed to a DCT coefficient Tg2. In the quantization circuit 22 the DCT coefficient Tg2 is further transformed by quantization to a quantized coefficient Qg2 to be output to the variable-length coding circuit 23. In the variable-length coding circuit 23 the quantized coefficient Qg2 is subjected to variable-length coding, and the corresponding low-resolution coded data Eg2 is output to the multiplexing circuit 4.

At that time, in the information expansion unit 1c the quantized coefficient data Qg2 is transformed to the restored data ITg2, which is real-time data, to be output to the addition processing unit 20b. That is, in the inverse quantization unit 24 the quantized coefficient Qg2 is transformed by inverse quantization to the restored DCT coefficient IQg2. Further, in the inverse DCT circuit 25 the restored DCT coefficient IQg2 is transformed by inverse DCT to the restored ITg2.

In the addition processing unit 20b, since the restored data ITg2 corresponds to the intra-frame coding frame, the restored data ITg2 is output as it is to the frame buffer 26 without being subjected to addition, and is stored in the frame buffer 26.

Since image data generally has high intra-frame coding frame correlation, energy is concentrated into the DCT coefficients corresponding to lower frequency components for the data in frequency region, i.e., DCT coefficients, obtained by subjecting the image data to DCT. Therefore, in quantizing the DCT coefficient, it is possible to reduce the amount of data to be transmitted or recorded while holding a degradation in picture quality to a minimum by finely quantizing the DCT coefficient corresponding to the important lower frequency component while roughly quantizing the DCT coefficient corresponding to the visually unimportant higher frequency component.

Further, image signals of frames (a P and a B frame) except the intra-frame coding frame in the low-resolution image signal Lg, are subjected to predictive coding in which the image data required for prediction is obtained for each frame, the predicted data corresponding to the target processing data is calculated from the image data, and prediction error data which is the difference between the predicted data and the target processing data is coded.

To be specific, initially, in the motion detecting circuit 28 of the predictive processing unit 2a, the motion vector MV2, which is used in predicting the target processing data, is obtained in each two-dimensional block, for example, by the well-known exhaustive search. Thereafter, in the motion compensation circuit 27, a prescribed image data in the frame buffer 26 is calculated as predicted data for the target processing data, based on the detected motion vector MV2.

Thereafter, in the subtraction processing unit 20a the difference signal between the predicted data and the target processing data is obtained as prediction error data for the target processing data. The prediction error data is, as similar to the target processing data for the intra-frame coding frame, transformed to the compressed data Qg2 by information compression in the DCT circuit 21 and the quantization circuit 22. Further, the compressed data Qg2 is coded by the variable-length coding circuit 23 to be output as the low-resolution coded data Eg2 to the multiplexing circuit 4. At this time, the output Qg2 of the quantization circuit 22 is subjected to information expansion by the inverse quantization circuit 24 and the inverse DCT circuit 25 to be output to the addition processing unit 20b. In the addition processing unit 20b, since the restored data ITg2 that is the output of the information expansion unit 2c corresponds to the prediction error data, the restored data ITg2 is added to the predicted data corresponding to the target processing data to be output to the frame buffer 26.

In such an inter-frame predictive coding, since the prediction error data that is the difference between the target processing data and the corresponding predicted data is coded, energy, i.e., a data value, of the frequency region transformed by DCT is reduced compared with the case such as intra-frame coding where the digital image signal is directly coded, thereby making possible higher efficient coding.

Further, although the high-resolution image signal, that is, the input digital image signal Sg, is subjected to the almost similar coding for the low-resolution image signal Lg, the coding for the high-resolution image signal Sg in the first compressive coding unit 1 differs from that for the low-resolution image signal Lg in the second compressive coding unit 2 in the point where the image data obtained from the low-resolution image signal Lg is used when the predicted data for the target processing data of the high-resolution image signal Sg is generated.

That is, in the first compressive coding unit 1, the generation of the predicted data corresponding to the target processing data is carried out by the motion compensation circuit 17, but at the time, the motion compensation circuit 17 receives the high-resolution image data stored in the frame buffer 16 and the resolution converted predicted data that is the output from the second resolution conversion circuit 32, and then the motion compensation circuit 17 calculates the differences between the two data and the target processing data, and the data having the smaller difference is selected as reference data.

Further, the high-resolution image data is the image data that corresponds to the two-dimensional block in the previous frame before the current frame which is being a target of processing. The resolution converted predicted data is such that the image data corresponding to the two-dimensional block of the previous frame in the frame buffer 26 is subjected to resolution conversion by the second resolution conversion circuit 32 in a way in which the resolution doubles in the horizontal and vertical directions.

In such a hierarchical coding, for the digital image signal, i.e., the high-resolution image signal, that is not subjected to resolution conversion, the image data of the portion where the error between the high-resolution image signal and the low-resolution image signal is small is not required to be coded, whereby the coding efficiency can be increased.

As described above, the low-resolution and high-resolution image signals Eg2 and Eg1, which are obtained by coding the low-resolution image signal Lg and the high-resolution image signal Sg, are multiplexed in the multiplexing circuit 4, and the multiplexed bit stream MEg is output.

On the other hand, in a decoding apparatus which decodes such a multiplexed bit stream MEg, the low-resolution image, i.e., SDTV, can be regenerated by taking the coded image data of low-resolution from a kind of coded image data and decoding the same. Further, the high-resolution image, i.e., HDTV, can be regenerated by taking both of coded image data of low-resolution and high-resolution from a kind of the coded image data and decoding the same.

Thus, the user can switch low-resolution image and high-resolution image, according to the situation, to carry out the regeneration. (For example, ISO/IEC IS 13818-2: Information technology—Generic coding of moving pictures and associated audio information—Part 2: Video", 1996.5)

However, in the hierarchical coding apparatus having the foregoing configuration, the motion compensation circuit 17 of the first compressive coding unit 1 receives both the high-resolution image data and the low-resolution image data, i.e., resolution converted predicted data, as reference data used in prediction, selects either which has the smaller error between the target processing data and it, as reference data, and by the use of the selected reference data, generates the predicted data for the high-resolution target processing data, so that the configuration of the motion compensation circuit 17 becomes much complicated.

Further, in decoding, the low-resolution image can be regenerated if applied to a decoding apparatus for a low-resolution image. The high-resolution image cannot be regenerated as long as the low-resolution coded data is not decoded, because the low-resolution image is used in prediction. Thus, in the decoding apparatus for high-resolution image that decodes high resolution coded data in the multiplexed bit stream coded by the conventional hierarchical coding apparatus, the configuration of the decoding apparatus for the low-resolution side must be incorporated inside the decoding apparatus for the high-resolution side, so that the amount of calculation in decoding is increased along with the scale of hardware.

Further, in the conventional hierarchical decoding apparatus, the decoding unit for low-resolution image signals and the decoding unit for high-resolution signals are required to be synchronized each other in their operation, so that the configuration of the whole apparatus becomes complicated.

SUMMARY OF THE INVENTION

It is an object of the present invention to provide the solution to those problems, which can reduce the amount of operation in the hierarchical coding and decoding for the digital image data having different resolutions, thereby obtaining a hierarchical image processing apparatus and hierarchical image processing method that can carry out efficiently the hierarchical coding and decoding by the use of simple circuit configuration.

It is another object of the present invention to provide a data storage medium for storing a multiplexed bit stream obtained by hierarchical coding which reduces the amount of operation, and a data storage medium for storing a program which realizes, by software, hierarchical coding and decoding which reduce the amount of operation.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of the present invention, a hierarchical image processing apparatus which receives a high-resolution first digital image signal and a low-resolution second digital image signal as input image signals, and subjects both of the digital image signals to hierarchical coding, said apparatus comprising: compressive coding means for subjecting the first and second digital image signals to compressive coding and outputting first and second coded image data; decompressive decoding means for subjecting the first and second coded image data to decompressive decoding and outputting first and second decoded image signals; and resolution conversion means for, based on the second decoded image signal, generating a third decoded image signal which corresponds to a specific image signal constituting a portion of the second decoded image signal and the resolution of which becomes equal to the resolution of the first decoded image signal; the compressive coding means subjecting the first digital image signal to compressive coding, using only the third decoded image signal as a reference image signal for a low resolution side, thereby making the reduction of compression efficiency of image data and the like, which are transmitted or stored, less, and simplifying the configuration of the hierarchical coding apparatus.

According to a second aspect of the present invention, the hierarchical image processing apparatus includes a compressive coding means that subjects the image signal corresponding to at least a portion of a frame, that constitutes the first digital image signal, to predictive coding which uses the third decoded image signal as a reference signal, thereby reducing the amount of operation to a great extent, for example, in the predictive coding of the image signal corresponding to the I frame for the high-resolution side.

According to a third aspect of the present invention, the hierarchical image processing apparatus includes a third decoded image signal as an image signal corresponding to an intra-frame coding frame, thereby reducing the amount of operation to a great extent, for example, in the predictive coding of the image signal corresponding to the I frame for the high-resolution side.

According to a fourth aspect of the present invention, a hierarchical image processing apparatus which receives a high-resolution first digital image signal and a low-resolution second digital image signal as input image signals, and subjects both of the digital image signals to hierarchical coding, said apparatus comprising: compressive coding means for subjecting the first and second digital image signals to compressive coding and outputting first and second coded image data; decompressive decoding means for subjecting the first and second coded image data to decompressive decoding and outputting first and second decoded image signals; and resolution conversion means for, based on the first decoded image signal, generating a third decoded image signal which corresponds to a specific image signal constituting a portion of the first decoded image signal and the resolution of which becomes equal to the resolution of the second decoded image signal; the compressive coding means replacing a specific portion of the second digital image signal with the third decoded image signal to generate a replaced image signal, subjecting the other portions of the second digital image signal except the specific portion to compressive coding, and outputting coded image data corresponding to the other portions of the second digital image signal, as second coded image data, thereby making the reduction of compression efficiency of image data and the like, which are transmitted or stored, less, and simplifying the configuration of the hierarchical coding apparatus.

According to a fifth aspect of the present invention, the hierarchical image processing apparatus of the fourth aspect of the present invention wherein the third decoded image signal is an image signal corresponding to an intra-frame coding frame, thereby reducing the amount of operation to a great extent in coding a low-resolution image signal.

According to a sixth aspect of the present invention, a hierarchical image processing apparatus which receives high-resolution first coded image data and low-resolution second coded image data as input image data, and subjects both of the coded image data to hierarchical decoding, said apparatus comprising: decompressive decoding means for subjecting the first and second coded image data to decompressive decoding and outputting first and second decoded image signals; and resolution conversion means for, based on the second decoded image signal, generating a third decoded image signal which corresponds to a specific image signal constituting a portion of the second decoded image signal and the resolution of which becomes equal to the resolution of the first decoded image signal; the decompressive decoding means subjecting the first coded image data to decompressive decoding, using only the third decoded image signal as a reference image signal for a low resolution side, thereby reducing the amount of operation and simplifying the configuration of the hierarchical decoding apparatus.

According to a seventh aspect of the present invention, the hierarchical image processing apparatus of the sixth aspect of the present invention wherein the decompressive decoding means subjects the coded data corresponding to at least a portion of a frame, that constitutes the first coded image data, to predictive decoding which uses the third decoded image signal as a reference signal, thereby reducing the amount of operation to a great extent, for example, in the predictive coding of the image signal corresponding to the I frame for the low-resolution side.

According to an eighth aspect of the present invention, the hierarchical image processing apparatus of the sixth aspect of the present invention wherein the third decoded image signal is an image signal corresponding to an intra-frame coding frame, thereby reducing the amount of operation to a great extent, for example, in the predictive coding of the image signal corresponding to the I frame for the low-resolution side.

According to a ninth aspect of the present invention, a hierarchical image processing apparatus which receives high-resolution first coded image data and low-resolution second coded image data as input image data, and subjects both of the coded image data to hierarchical decoding, said apparatus comprising: decompressive decoding means for subjecting the first and second coded image data to decompressive decoding and outputting first and second decoded image signals; and resolution conversion means for, based on the first decoded image signal, generating a third decoded image signal which corresponds to a specific image signal constituting a portion of the first decoded image signal and the resolution of which becomes equal to the resolution of the second decoded image signal; the decompressive decoding means replacing a portion of the second digital image signal with the third decoded image signal to generate a replaced image signal, and outputting the second decoded image signal the specific portion of which is replaced with the third decoded image signal, thereby simplifying the decoding of the low-resolution digital image signal and thus simplifying the configuration of the hierarchical decoding apparatus.

According to a tenth aspect of the present invention, the hierarchical image processing apparatus of the ninth aspect of the present invention wherein the third decoded image signal is an image signal corresponding to an intra-frame coding frame, thereby reducing the amount of operation to a great extent in decoding the low-resolution image signal. According to an eleventh aspect of the present invention, a hierarchical image processing method which divides a first bit stream containing first coded data obtained by subjecting a first digital image signal having a first resolution to compressive coding, and a second bit stream containing second code data obtained by subjecting a second digital image signal having a second resolution which is different from the first resolution to compressive coding, into packets to be multiplexed, and outputs a multiplexed bit stream, wherein both the bit streams are multiplexed in a way in which the packets, in the multiplexed bit stream, corresponding to the first and second bit streams, are arranged in the order of frames when the first and second coded data are decoded in a prescribed order of frames, and the packets of a frame corresponding to both of the coded data abut each other, thereby easily detecting coded data corresponding to a necessary frame in decoding both of the bit streams.

According to the twelfth aspect of the present invention, a hierarchical image processing method which multiplexes a first bit stream containing first coded data obtained by subjecting a first digital image signal having a first resolution to compressive coding and a second bit stream containing second code data obtained by subjecting a second digital image signal having a second resolution which is different from the first resolution, and outputs a multiplexed bit stream, wherein in the multiplexed bit stream an identification flag, which shows the specific image data in the second bit stream that is necessary for decoding the first bit stream, is multiplexed with the first and second bit streams, thereby easily extracting necessary coded data from the second bit stream in decoding the first bit stream.

According to a thirteenth aspect of the present invention, a hierarchical image processing method which multiplexes a first bit stream containing first coded data obtained by subjecting a first digital image signal having a first resolution to compressive coding and a second bit stream containing second code data obtained by subjecting a second digital image signal having a second resolution which is different from the first resolution, and outputs a multiplexed bit stream, wherein in the multiplexed bit stream a prescribed flag is multiplexed with the first and second bit streams; and the prescribed flag is an identification flag showing an inserting position, in the second bit stream, for inserting the first coded data necessary for decoding the second bit stream into the second bit stream; or the prescribed flag is an identification flag showing an inserting position, in the second decoded image data, for inserting the first decoded image data obtained by expanding the first coded data necessary for decoding the second bit stream into the second decoded image data obtained by the expansion of the second coded data, thereby easily detecting the inserting position of the first coded data into the second bit stream or the inserting position of the first decoded image data into the second decoded image data, in decoding both the bit streams.

According to a fourteenth aspect of the present invention, a hierarchical image processing apparatus which receives a first bit stream containing first coded data obtained by subjecting a first digital image signal having a first resolution to compressive coding and a second bit stream containing second code data obtained by subjecting a second digital image signal having a second resolution which is different from the first resolution, and subjects both of the bit streams to hierarchical decoding, said apparatus comprising: coded data selection means for selecting necessary coded data from both of the bit streams; and image decoding means for regenerating image data by decoding the selected coded data; the coded data selection means, in case of decoding the first bit stream, supplying the coded data contained in the first bit stream, and a portion of the coded data, in the second bit stream, that is necessary for decoding the first bit stream, to the image decoding means, thereby reducing the amount of operation in decoding.

According to a fifteenth aspect of the present invention, a hierarchical image processing apparatus which receives a first bit stream containing first coded data obtained by subjecting a first digital image signal having a first resolution to compressive coding and a second bit stream containing second code data obtained by subjecting a second digital image signal having a second resolution which is different from the first resolution, and subjects both of the bit streams to hierarchical decoding, said apparatus comprising: coded data selection means for selecting necessary coded data from both of the bit streams; and image decoding means for regenerating image data by decoding the selected coded data; the image decoding means, at the time that the decoding of a portion of the coded data, contained in the second bit stream, necessary for decoding the first bit stream, is completed, outputting a signal of indicating the end of processing to the coded data selection means; andthe coded data selection means, in decoding the first bit stream, outputting the first and second bit streams to the image decoding means, and stopping outputting the second bit stream to the image decoding means by receiving the signal of indicating the end of processing, thereby removing the process for an unnecessary signal in decoding the first bit stream.

According to a sixteenth aspect of the present invention, a hierarchical image processing apparatus which receives a first bit stream containing first coded data obtained by subjecting a first digital image signal having a first resolution to compressive coding and a second bit stream containing second code data obtained by subjecting a second digital image signal having a second resolution which is different from the first resolution, and subjects both of the bit streams to hierarchical decoding, said apparatus comprising: coded data selection means for selecting necessary coded data from both of the bit streams; and image decoding means for regenerating image data by decoding the selected coded data; the coded data selection means rearranging the coded data in the first and second bit streams in a order in which the coded data is decoded, and outputting the rearranged coded data to the image decoding means, thereby reducing the amount of the coded data temporarily retained in the image decoding means, in decoding.

According to a seventeenth aspect of the present invention, a hierarchical image processing apparatus which receives a first bit stream containing first coded data obtained by subjecting a first digital image signal having a first resolution to compressive coding and a second bit stream containing second code data obtained by subjecting a second digital image signal having a second resolution which is different from the first resolution, and subjects both of the bit streams to hierarchical decoding, said apparatus comprising: coded data selection means for selecting necessary coded data from both of the bit streams; and image decoding means for regenerating image data by decoding the selected coded data; the coded data selection means rearranging the coded data in the first and second bit streams in a way to minimize a delay time that is a time elapsing since the coded data is input to the image decoding means until the coded data is subjected to decoding, and outputting the rearranged coded data to the image decoding means, thereby reducing the amount of the coded data temporarily retained in the image decoding means, in decoding.

According to an eighteenth aspect of the present invention, a hierarchical image processing apparatus which receives a first bit stream containing first coded data obtained by subjecting a first digital image signal having a first resolution to compressive coding and a second bit stream containing second coded data obtained by subjecting a second digital image signal having a second resolution which is different from the first resolution, and subjects both of the bit streams to hierarchical decoding, said apparatus comprising: coded data selection means for selecting necessary coded data from both of the bit streams; and image decoding means for regenerating image data by decoding the selected coded data; the coded data selection means making a portion of the coded data, in the second bit stream, necessary for decoding the first bit stream, included in the first bit stream, and outputting the portion of the coded data to the image decoding means, thereby carrying out the decoding of the first bit stream efficiently.

According to a nineteenth aspect of the present invention, a hierarchical image processing apparatus which subjects the multiplexed bit stream multiplexed by the hierarchical image processing method of the eleventh aspect of the present invention to hierarchical decoding, said apparatus comprising: coded data selection means for selecting coded data necessary for decoding, from the first and second bit stream; and image decoding means for decoding the selected coded data to regenerate image data, thereby carrying out the hierarchical decoding of the multiplexed bit stream multiplexed by the hierarchical image processing method of the eleventh aspect of the present invention.

According to a twentieth aspect of the present invention, a hierarchical image processing apparatus which subjects the multiplexed bit stream multiplexed by the hierarchical image processing method of the twelfth aspect of the present invention to hierarchical decoding, said apparatus comprising: coded data selection means for selecting coded data necessary for decoding, from the first and second bit stream; and image decoding means for decoding the selected coded data to regenerate image data, thereby carrying out the hierarchical decoding of the multiplexed bit stream multiplexed by the hierarchical image processing method of the twelfth aspect of the present invention.

According to a twenty-first aspect of the present invention, a data storage medium storing a bit stream wherein the bit stream contains the first and second coded image data subjected to hierarchical coding by the hierarchical image processing apparatus of the first aspect of the present invention, thereby simplifying the configuration of the decoding apparatus for decoding the bit stream.

According to a twenty-second aspect of the present invention, a data storage medium storing a bit stream wherein the bit stream contains the first and second coded image data subjected to hierarchical coding by the hierarchical image processing apparatus of the fourth aspect of the present invention, thereby simplifying the configuration of the decoding apparatus for decoding the bit stream.

According to a twenty-third aspect of the present invention, a data storage medium storing a program for executing hierarchical coding by a computer wherein the program makes the computer execute the hierarchical coding according to the hierarchical image processing apparatus of the first aspect of the present invention, thereby reducing the reduction of compression efficiency less and by software, realizing the hierarchical coding apparatus having a simple configuration.

According to a twenty-fourth aspect of the present invention, a data storage medium storing a program for executing hierarchical coding by a computer wherein the program makes the computer execute the hierarchical coding according to the hierarchical image processing apparatus of the fourth aspect of the present invention, thereby reducing the reduction of compression efficiency less and by software, realizing the hierarchical coding apparatus having a simple configuration.

According to a twenty-fifth aspect of the present inventino, a data storage medium storing a program for executing hierarchical decoding by a computer wherein the program makes the computer execute the hierarchical decoding according to the hierarchical image processing apparatus of the sixth aspect of the present invention, thereby reducing the amount of operation of hierarchical decoding and by software, realizing the hierarchical decoding apparatus having a simple configuration.

According to a twenty-sixth aspect of the present invention, a data storage medium storing a program for executing hierarchical decoding by a computer wherein the program makes the computer execute the hierarchical decoding according to the hierarchical image processing apparatus of the ninth aspect of the present invention, thereby reducing the amount of operation of hierarchical decoding and by software, realizing the hierarchical decoding apparatus having a simple configuration.

BRIEF DESCRIPTION OF THE DRAWINGS

FIG. 3(a) and FIG. 3(b) are diagrams showing a data structure of a multiplexed bit stream which is an output of the hierarchical coding apparatus 101 according to the first embodiment.

FIG. 17 is a diagram for explaining a conventional hierarchical image coding apparatus.

Figure 1:
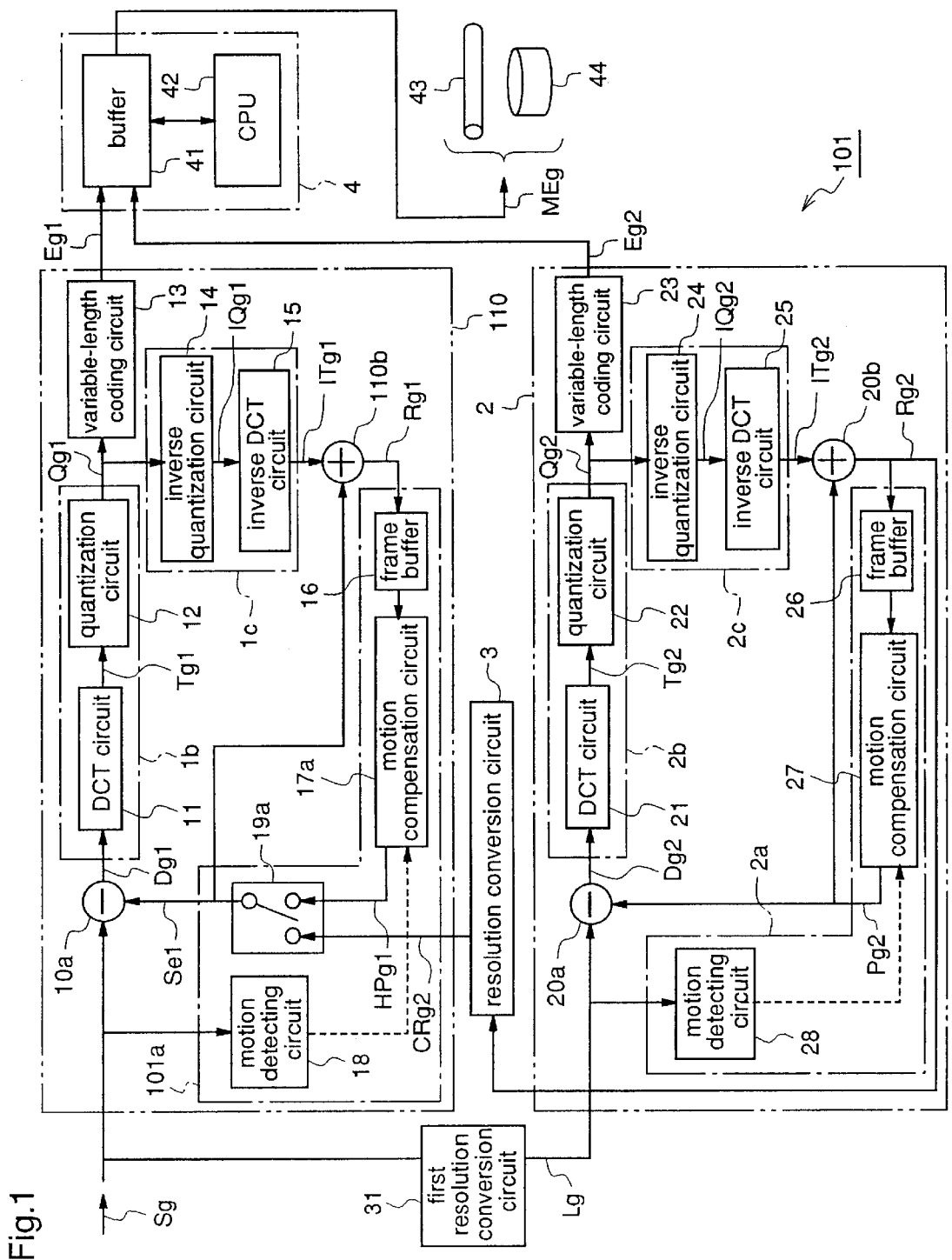
FIG. 1 is a block diagram for explaining a hierarchical coding apparatus according to a first embodiment of the present invention.
Figure 2:
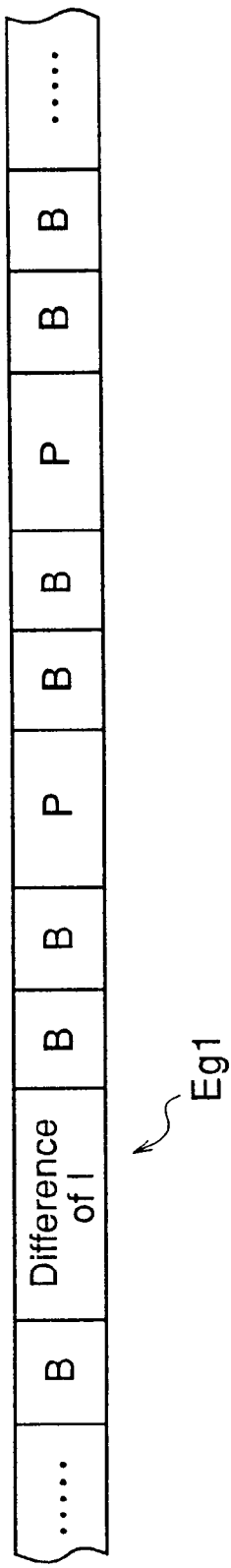
FIG. 2(a) is a diagram showing a data structure of an output, i.e., a bit stream of a high-resolution image, of a first compressive coding unit of a hierarchical coding apparatus 101 according to the first embodiment.
FIG. 2(b) is a diagram showing a data structure of an output, i.e., a bit stream of a low-resolution image, of a second compressive coding unit of the hierarchical coding apparatus 101 according to the first embodiment.
Figure 2:
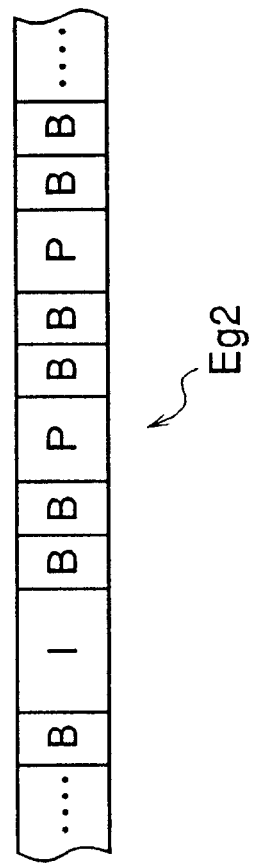

BRIEF DESCRIPTION OF REFERENCE NUMERALS 1,2 first and second compressive coding units
1a, 2a predictive processing units
1b, 2b information compression units
1c, 2c information expansion units
3 resolution conversion circuit
4 multiplexing circuit
6 stream selection means
7, 8 first and second decoding units
10a, 20a subtraction processing units
10b, 20b addition processing units
11, 21 DCT circuits
12, 22 quantization circuits
13, 23, 63 variable-length coding circuits
14, 24 inverse quantization circuits
15, 25 inverse DCT circuits
16, 26 frame buffers
17, 27 motion compensation circuits
18, 28 motion detecting circuits
19 selection switch
29 switch
31, 32 first and second resolution conversion circuits
41, 61 buffers
42, 62 CPUs
43 transmission medium
44 storage medium
101 hierarchical coding apparatus
CPg resolution converted predicted signal
Dg1, Dg2 output data of the subtraction processing unit
Eg1 high-resolution coded data
Eg2 low-resolution coded data
IQg1, IQg2 restored DCT coefficients
ITg1, ITg2 expanded data
Lg low-resolution image signal
Mcg multiplexed bit stream
Qg1, Qg2 quantization coefficients (compressed data)
Pg1, Pg2 predicted data
Sg digital image signal (high-resolution image signal)
Tg1, Tg2 DCT coefficients
Rg1, Rg2 regenerated data

DETAILED DESCRIPTION OF THE PREFERRED EMBODIMENTS

Embodiments of this invention are described as follows.
[Embodiment 1 ]

FIG. 1 to FIG. 5 are diagrams for explaining a hierarchical coding apparatus and a hierarchical coding method according to a first embodiment of this invention. FIG. 1 is a block diagram showing the configuration of the hierarchical coding apparatus according to the first embodiment.

A hierarchical coding apparatus 101 according to the first embodiment receives a digital image signal Sg as an input, and subjects the image signal Sg to hierarchical coding. The hierarchical coding apparatus 101, as similar to the conventional hierarchical coding apparatus 200, comprises a first compressive coding unit 110 for compressively coding the digital image signal Sg, a first resolution conversion circuit 31 for subjecting the digital image signal Sg to resolution conversion and outputting a low-resolution image signal Lg, and a second compressive coding unit 2 for compressively coding the low-resolution image signal Lg. Further, before being input to the hierarchical coding apparatus 101, the digital image signal Sg (hereinafter also referred to as a high-resolution image signal) is divided into frames, and each frame is divided into coding units. In this case, the first resolution conversion circuit 31 and the second compressive coding unit 2 have thoroughly the same configuration as those of the conventional hierarchical coding apparatus 200.

The hierarchical coding apparatus 101 further comprises a resolution conversion circuit 3 for subjecting regenerated data Rg2, which is generated in the second compressive coding unit 2, to resolution conversion in a way that its resolution becomes equal to that of the high-resolution image signal Sg. The resolution conversion circuit 3 outputs data CRg2 to the first compressive coding unit 110.

The first compressive coding unit 110 comprises a predictive processing unit 101a, a subtraction processing unit 110a, an information compression unit 1b, i.e., compressive coding means, and a variable-length coding circuit 13. The prediction processing unit 101a receives the high-resolution image signal Sg and generates predicted data Se1 corresponding to the portion of signal Sg that is a target of coding (hereinafter referred to as a target processing signal). The subtraction processing unit 110a calculates the difference between the target processing signal and the predicted data Se1 as prediction error data Dg1, depending on a coding mode of the high-resolution image signal Sg. The information compression unit 1b subjects the output Dg1 of the subtraction processing unit 110a to information compression. The variable-length coding circuit 13 subjects the output Qg1 of the information compression unit 1b to variable-length coding. In this case, as similar to the conventional hierarchical coding apparatus 200, the information compression unit 1b comprises a DCT circuit 11 and a quantization circuit 12.

The first compressive coding unit 110 further comprises an information expansion unit 1c for subjecting the output Qg1 of the information compression unit 1b to information expansion and outputting expanded data ITg1, and an addition processing unit 110b for adding the expanded data ITg1 to the high-resolution predicted data Se1 depending on a coding mode of the high-resolution image signal Sg. In this case, the information expansion unit 1d comprises an inverse quantization circuit 14 and an inverse DCT circuit 15, to similar to the conventional coding apparatus 200.

Further, in the first embodiment, the predictive processing unit 101a comprises a frame buffer 16, a motion detecting circuit 18, a motion compensation circuit 17a and a selection switch 19a. The frame buffer 16 stores the output Rg1, i.e., regenerated data, of the addition processing unit 110b. The motion detecting circuit 18 obtains the motion vector MV1 corresponding to the target processing signal. The motion compensation circuit 17a obtains high-resolution predicted data HPg1 corresponding to the target processing signal from the high-resolution image data stored in the frame buffer 16, based on the motion vector MV1 from the motion detecting circuit 18. The selection switch 19a selects the resolution converted regenerated data CRg2 obtained by subjecting the regenerated data Rg2 to resolution conversion which is the output of the resolution conversion circuit 3, or the high-resolution predicted data HPg1 which is the output of the motion compensation circuit 17, depending on the coding mode, and outputs the selected signal as the predicted data Se1.

The hierarchical coding apparatus 101, as similar to the conventional hierarchical coding apparatus 200, further comprises a multiplexing circuit 4 for multiplexing the coded data Eg1 which is output from the first compressive coding unit 1 and the coded data Eg2 which is output from the second compressive coding unit 2 to generate a multiplexed bit stream MEg and outputting the MEg. The multiplexed bit stream MEg which is the output of the multiplexing circuit 4 is output to a transmission medium 43 or a storage medium 44. Further, the multiplexing circuit 4 comprises a buffer 41 for retaining both of the coded data Eg1 and Eg2, and a CPU 42 for controlling the multiplexing of the coded data retained in the buffer 41.

The operation is explained as follows.

The hierarchical coding apparatus 101 according to the first embodiment, the units except the predictive processing unit 101a carry out almost the same operation as the conventional image coding apparatus. Therefore, the basic operation of the hierarchical coding apparatus 101 is omitted.

The hierarchical coding apparatus 101 according to the first embodiment has such a configuration that only when the coded data corresponding to the I frame that is a portion of the high-resolution image signal Sg is coded, the resolution converted regenerated data obtained by subjecting the low-resolution regenerated data to resolution conversion is used as predicted data. This is a different point from the conventional hierarchical coding apparatus.

Note that the conventional hierarchical coding apparatus 200 has a configuration in which when the high-resolution image signal is coded, the signal CPg2 obtained by subjecting the low-resolution regenerated data Rg2 to resolution conversion is always used as predicted data.

To be specific, in coding the image signal in high-resolution image signal Sg corresponding to the intra-frame coding frame (hereinafter referred to as I frame), the selection switch is controlled in a way in which the resolution converted regenerated data CRg2 obtained by subjecting the low-resolution regenerated data Rg2 to resolution conversion is supplied to the subtraction processing unit 10a. The subtraction processing unit 110a calculates the difference in values between the output Se1 of the selection switch 19a and the target processing signal, and outputs the difference value as prediction error data Dg1 to the information compression unit 1b.

Further, in coding the image signal corresponding to another frame in the high-resolution image signal Sg, i.e., for example, the one-directional predictive frame (P frame) and bidirectionally predictive coding frame (B frame) in the MPEG-based coding method, predictive coding is carried out for the target processing signal using the high-resolution regenerated data without using the resolution converted regenerated data obtained by subjecting the low-resolution regenerated data to resolution conversion.

In general, the image space formed by the high-resolution image signal and the image space formed by the low-resolution image signal have largely different densities of the pixels constituting the image space, so that in the predictive processing for the target processing signal, the usage of an image signal having the same resolution as that of the target processing signal but having a different frame from the frame corresponding to the target processing signal is more efficient than using an image signal having a different resolution from that of the target processing signal.

Accordingly, since an image signal corresponding to the I frame is not subjected to temporal prediction, for the I frame, predictive coding in which the low-resolution regenerated data corresponding to the target processing signal is used as predicted data is more efficient than the processing in which the target processing signal of the I frame is coded as it is. However, for other frames, even when the image signal having a different resolution is not used as predicted data, the compression efficiency is not reduced much compared with the case that all image signals are subjected to predictive coding.

On the other hand, in the configuration of the hierarchical coding apparatus, the configuration of the motion compensation circuit 17a becomes simple, because the difference between the target processing signal and the corresponding low-resolution predicted data, i.e., the prediction error, is not required to be calculated.

It should be noted that it is possible to use a low-resolution image signal of any of an I, a P and a B frame in the predictive processing for a high-resolution image signal of the I frame, but low-resolution regenerated data corresponding to the I frame is most desirable to be used, considering that the configuration of a compressive coding unit for the low-resolution side, i.e., the first compressive coding unit, is simplified because the frame buffer 26 and motion compensation circuit 27 in the compressive coding unit for the low-resolution side, i.e., the second compressive coding unit, are not necessary.

Further, the coded data Eg1 and Eg2, i.e., bit streams, which are the outputs of the first and second compressive coding units 110 and 2 respectively, are input to and retained in the buffer 41, and by the control of the CPU 42, both of the bit streams are multiplexed to generate a multiplexed stream MEg which is output to the transmission medium 43 or the storage medium 44.

FIG. 2(a) and FIG. 2(b) are diagrams for explaining the coded data that are output from the first compressive coding unit 101 and second compressive coding unit 2 of the hierarchical coding apparatus 101. FIG. 2(a) shows a data structure of the high-resolution coded data Eg1, i.e., a bit stream of a high-resolution image. FIG. 2(b) shows a data structure of the low-resolution coded data Eg2, i.e., a bit stream of a low-resolution image.

In the high-resolution coded data Eg1, i.e., a bit stream of a high-resolution image, intra-frame coding frames (I frame), inter-frame forward predictive coding frames (P frame) and bidirectionally predictive coding frame (B frame) are arranged to be repeated in a prescribed order. In the low-resolution coded data Eg2, i.e., a bit stream of a low-resolution image, intra-frame coding frames (I frame), inter-frame forward predictive coding frames (P frame) and bidirectionally predictive coding frame (B frame) are arranged to be repeated in the same order as that for the high-resolution coded data. The order of arranging each frame in each coded data corresponds to the order of coding each frame. Further, the length of each frame of both of the coded data Eg1 and Eg2 corresponds to the amount of the compressed image data.

Further, as hereinbefore described, in the hierarchical coding apparatus 101, the coded data corresponding to the I frame of the high-resolution image is obtained by subjecting the high-resolution image signal Sg to predictive coding using the regenerated data corresponding to, for example, the I frame, of the low-resolution image, so that the coded data corresponding to the I frame of the high-resolution image is the data of the difference between the high-resolution image signal and the low-resolution image signal.

In general, in multiplexing a plurality of separate data, each separate data is divided into packets corresponding to the prescribed amount of data before being multiplexed, but when the respective separate data have the different amounts of data, the ratio of the data amounts of the respective separate data is made agree with the ratio of the lengths or numbers of the packets corresponding to the respective separate data. Therefore, the length or number of the packet corresponding to the low-resolution coded data having a fourth of the resolution of the high-resolution image, is a fourth of the length or number of the packet corresponding to the high-resolution coded data.

FIG. 3(*a*) and FIG. 3(*b*) are diagrams for explaining data structures of the multiplexed bit streams which are the outputs of the hierarchical coding apparatus 101. FIG. 3(*a*) shows a data structure of the multiplexed bit stream MEgx obtained by multiplexing the high-resolution coded data Eg1 and the low-resolution coded data Eg2. FIG. 3(*b*) shows a data structure of the multiplexed bit stream MEgy obtained by multiplexing the high-resolution coded data Eg1 and the low-resolution coded data Eg2 taking into account the order of the frames.

The multiplexed bit stream MEgx shown in FIG. 3(*a*) is an example of the output data of the multiplexing circuit 4, which contains packets a of the high-resolution coded data and packets b of the low-resolution coded data.

In the multiplexed bit stream, the ratio of the amount of the high-resolution coded data to the amount of the low-resolution coded data simply agrees with the ratio of the packet length of the high-resolution coded data to the packet length of the low-resolution coded data. Therefore, in the multiplexed bit stream MEgx, the data of each frame is divided into packets having a uniform length regardless of the kind of an I, a P and a B frame.

In the multiplexed bit stream described above, when only a portion of the low-resolution coded data, i.e., the coded data corresponding to I frames, is used in decoding the high-resolution coded data in the hierarchical decoding apparatus corresponding to the hierarchical coding apparatus according to the first embodiment, the following inconvenience arises. That is, in case of decoding the high-resolution coded data, the content of each packet, i.e., the coded data corresponding to each packet, must be completely examined in order to be decided whether to be an I frame or not, so that the configuration of the hierarchical decoding apparatus becomes complicated.

For that reason, in the multiplexing circuit 4 according to the first embodiment, as will be seen from the multiplexed bit stream shown in FIG. 3(*b*), for both the packet a corresponding to the high-resolution coded data and the packet b corresponding to the low-resolution coded data, nulls, that is, zeros, are padded after the coded data corresponding to a B frame in the packet corresponding to the B frame in order that the packet corresponding to the I frame after the B frame begins with the coded data corresponding to the I frame from the head. Further, in the multiplexed bit stream MEgy, a packet is arranged in a way that a packet corresponding to the I frame of low-resolution is positioned immediately after the packet corresponding to the I frame of high-resolution.

In the above-described multiplexed bit stream MEgy, several bytes of the head of each packet is always required to be examined in order to recognize the type of frame corresponding to the packet. Further, since the packet corresponding to the I frame of a high-resolution image is continuously followed by the packet corresponding to the I frame of a low-resolution image, the coded data corresponding to the I frame can be easy to be extracted.

The multiplexing in the multiplexing circuit 4 is described as follows.

Figure 4:
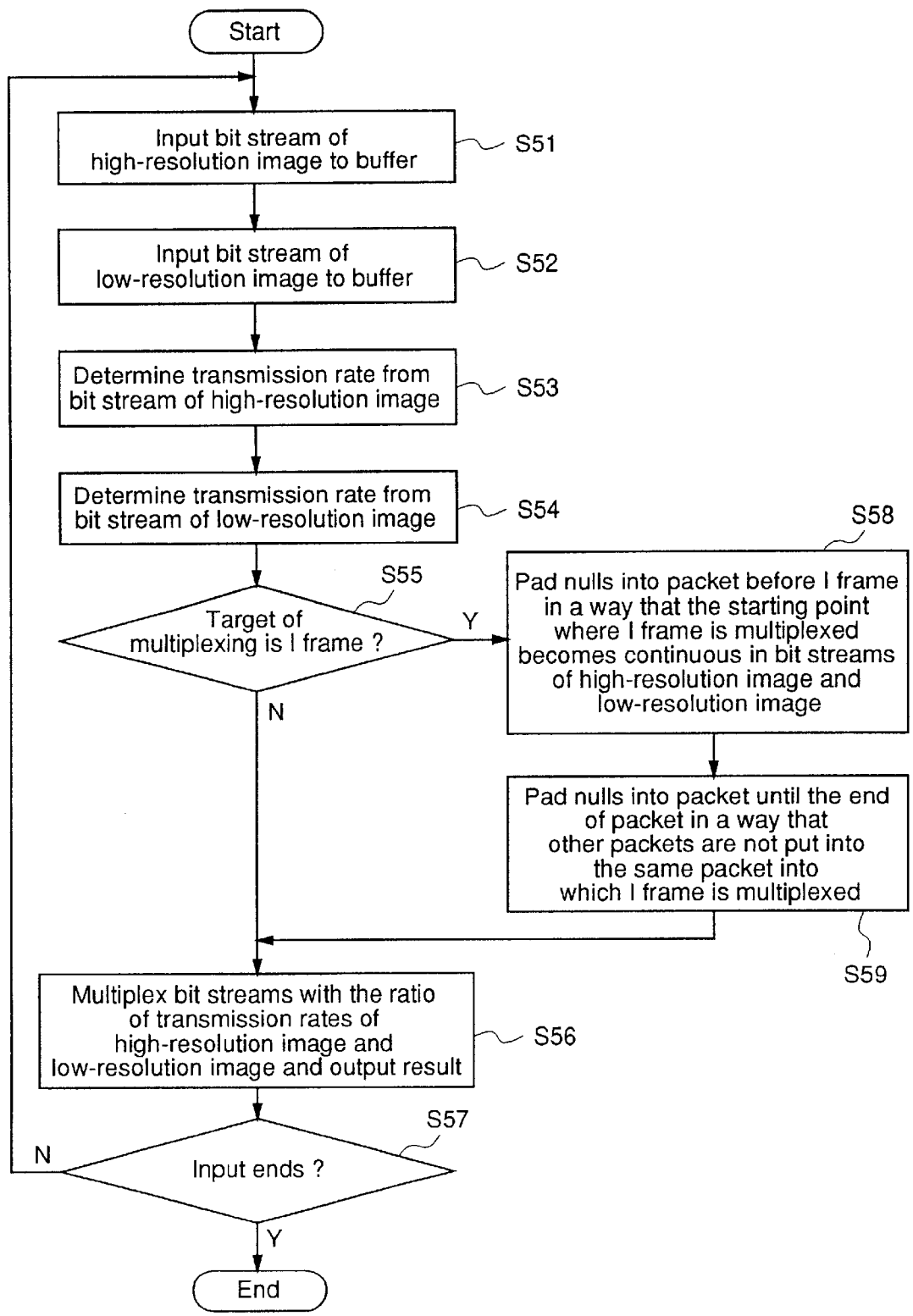
FIG. 4 is a diagram showing the flow by a CPU of the hierarchical coding apparatus according to the first embodiment.

FIG. 4 is a diagram showing the flow of the multiplexing by the CPU 42 in the multiplexing circuit 4. By the flow, the multiplexed bit stream MEgy having a data structure shown in FIG. 3(*b*) is obtained as the multiplexed bit stream MEg that is the output of the multiplexing circuit 4.

That is, in steps S51 and S52, by the control of the CPU 42, the high-resolution coded data EG1, i.e., a bit stream of a high-resolution image, and the low-resolution coded data Eg2, i.e., a bit stream of a low-resolution image, are input to the buffer 41 of the multiplexing circuit 4. Thereafter, in steps S53 and S54, by the operation of the CPU 42, the transmission rate of the high-resolution coded data and the transmission rate of the low-resolution coded data each are determined from the respective bit streams.

Thereafter, the CPU 42 decides whether the coded data that is a target of multiplexing corresponds to the I frame or not (step S55). Concerning a result of the decision, if the coded data that is a target of multiplexing does not correspond to the I frame, by the control of the CPU 42 the high-resolution coded data and low-resolution coded data in the buffer 41 are multiplexed with the ratio of the respective transmission rates, and the result is output (step S56). On the other hand, concerning a result of the decision in step S55, if the coded data that is a target of multiplexing corresponds to the I frame, by the control of the CPU 42 a packet before the packet corresponding to the I frame is padded with null in a way in which the coded data of the I frame begins from the head of the packet, and the packet corresponding to the I frame of a high-resolution image is continuously followed by the packet corresponding to the I frame of a low-resolution image, or vice versa (step S58).

Thereafter, for the packet corresponding to the I frame, nulls are padded after the coded data of the I frame lest the coded data of other frame are contained in the packet (step S59).

Thereafter, as similar to the coded data of other frame, the high-resolution coded data and low-resolution coded data in the buffer 41 are multiplexed with the ratio of the respective transmission rates, and the result is output (step S56).

Finally, it is decided whether the input of the coded data to the buffer 41 is finished or not (step S57). If it is finished, the multiplexing ends. If the input of the coded data is not finished, the CPU 42 repeats the processing of steps S51 to S57.

Note that the multiplexing by the multiplexing circuit 4 is not limited to the processing shown in FIG. 4, but for example, an identification flag may be added to the packet that stores the coded data in low-resolution coded data corresponding to the I frame.

Figure 5:
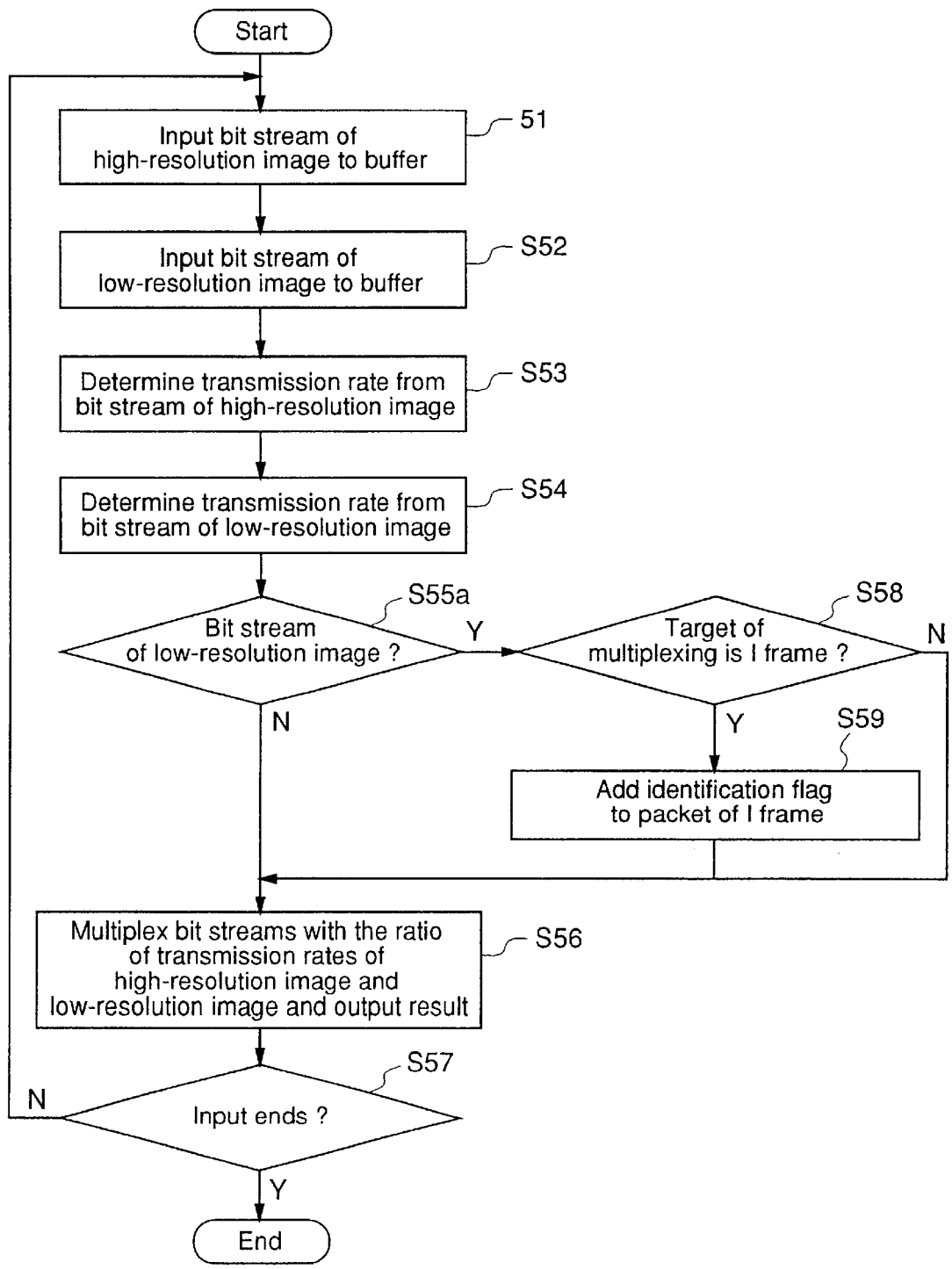
FIG. 5 is a diagram showing the flow of multiplexing using an identification flag by a CPU of the hierarchical coding apparatus according to the first embodiment.

FIG. 5 is a diagram showing the flow of multiplexing by the use of the identification flag.

In the multiplexing shown in FIG. 5, the processing for inputting the high-resolution and low-resolution coded data to the buffer (steps S51 and S52) and the processing for determining the transmission rate of each coded data (steps S53 and S54) are identical to those in the multiplexing shown in FIG. 4.

In the multiplexing shown in FIG. 5, in the following step S55a it is decided whether the coded data that is a target of multiplexing is low-resolution coded data or not. If the target data is not low-resolution coded data, by the control of the CPU 42 the high-resolution coded data and low-resolution coded data in the buffer 41 are multiplexed with the ratio of the respective transmission rates, and the result is output (step S56).

On the other hand, concerning a result of the decision in step S55, if the target data is low-resolution coded data, the CPU 42 decides whether the target data corresponds to the I frame or not (step S58). As a result of the decision, if the target data does not correspond to the I frame, the processing of step S56 is carried out, while if the target data corresponds to the I frame, by the control of the CPU 42 the packet in which the target data is stored is added with the flag that shows that the packet corresponds to the I frame (step S59).

In the foregoing multiplexing, all the packets in low-resolution coded data that contain the data corresponding to the I frame are added with the identification flags, so that the decoding apparatus is not required to examine the content of all the packets, but the packet that is necessary for decoding the high-resolution coded data can be extracted from the multiplexed bit stream. Further in this case, the data in the packet itself is not required to be processed, whereby making possible the simplification of the multiplexing.

It should be noted that in the multiplexing shown in FIG. 5 the identification flag is added to the packet corresponding to the I frame, but multiplexing is not limited to this. For example, the coded data in low-resolution image of the P frame or B frame except the I frame can be also used in decoding the high-resolution coded data by adding the identification flags to all the packets of any frame of low-resolution coded data that are used in decoding the high-resolution coded data, thereby obtaining the similar effect of the multiplexing shown in FIG. 5.

It should be noted that although in the first embodiment a signal corresponding to the I frame is selected from the resolution converted signal CRg2 obtained by subjecting the restored data Rg2 for the low-resolution side to resolution conversion, a resolution converted signal corresponding to the I frame may be obtained by selecting restored data corresponding to the I frame from the restored data Rg2 and thereafter subjecting the selected restored data to resolution conversion.

[Embodiment 2]

Figure 6:
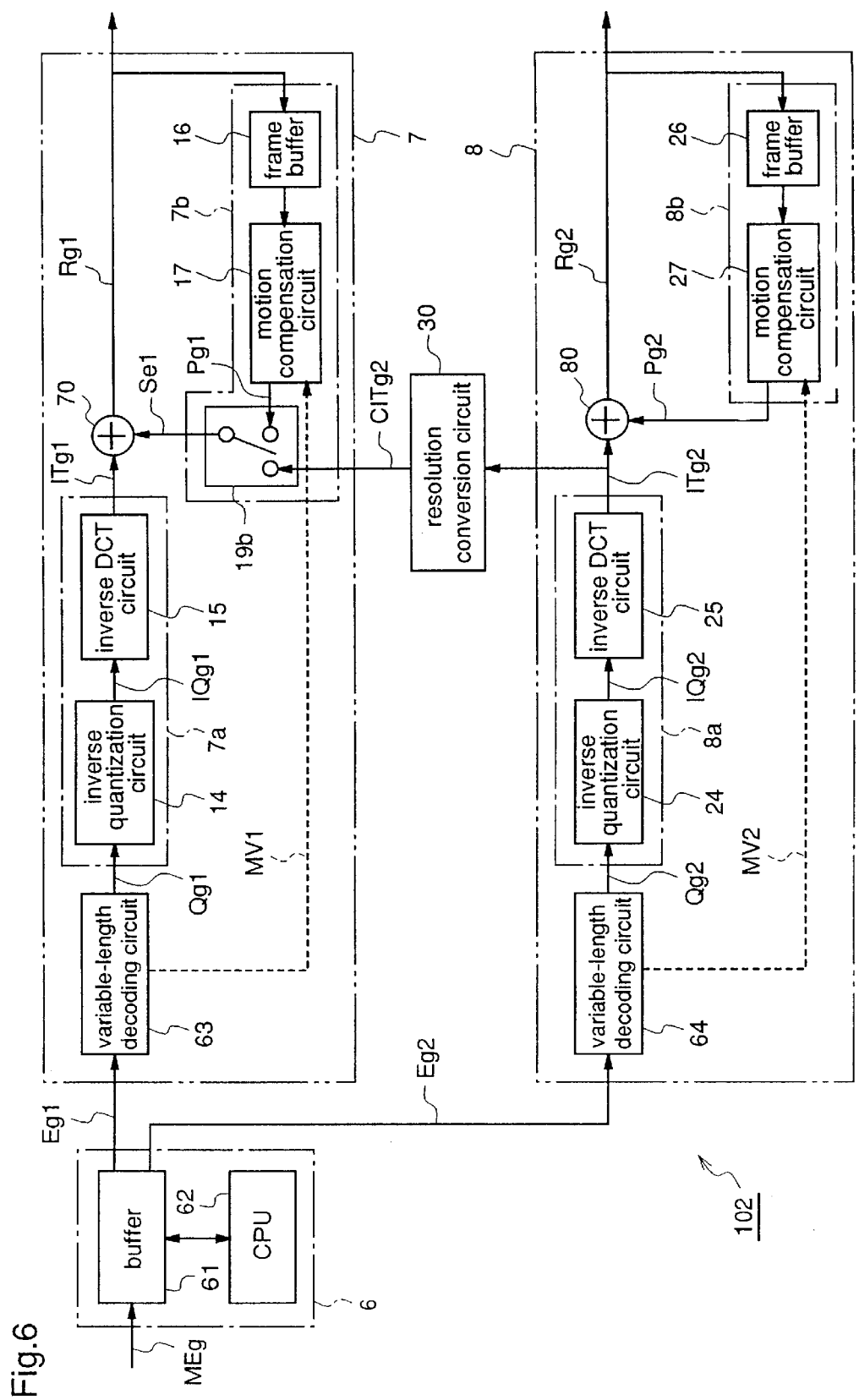
FIG. 6 is a block diagram for explaining a hierarchical decoding apparatus according to a second embodiment of the present invention.

FIG. 6 is a block diagram for explaining a hierarchical decoding apparatus and a hierarchical decoding method according to a second embodiment of this invention.

The hierarchical decoding apparatus 102 according to the second embodiment has such a configuration that the multiplexed bit stream MEg output from the hierarchical coding apparatus according to the first embodiment shown in FIG. 1 is decoded.

That is, the hierarchical decoding apparatus 102 comprises stream selection means 6, a second decoding unit 8, a resolution conversion circuit 30 and a first decoding unit 7. The stream selection means 6 receives the multiplexed bit stream MEg, and selects the necessary high-resolution coded data Eg1 and necessary low-resolution coded data Eg2 from the multiplexed bit stream MEg to be output. The second decoding unit 8 subjects the selected low-resolution coded data Eg2 to decoding and outputs regenerated data Rg2. The resolution conversion circuit 30 subjects the signal ITg2, that is halfway through the processing in the second decoding unit 8, to resolution conversion and outputs a resolution converted signal CITg2. The first decoding unit 7 subjects the selected high-resolution coded data Eg1 to decoding according to the resolution converted signal CITg2 and outputs regenerated data Rg1. In this case, the stream selection means 6 comprises a buffer 61 for storing the multiplexed bit stream MEg, and a CPU 62 for selecting the coded data Eg1 and Eg2 from the multiplexed bit stream MEg stored in the buffer 61.

The second decoding unit 8 comprises a variable-length decoding circuit 64, an information expansion unit 8a, i.e., decompressive decoding means, a predictive processing unit 8b and an addition processing unit 80. The variable-length decoding circuit 64 subjects the target processing data in low-resolution coded data Eg2 corresponding to two-dimensional blocks that is a target of decoding, to variable-length decoding and outputs decoded data Qg2, i.e., quantization coefficients, while outputting a motion vector MV2 corresponding to the two-dimensional block. The information expansion 8a subjects the decoded data Qg2 to information expansion to generate expanded data ITg2. The predictive processing unit 8b generates predicted data Pg2 corresponding to the target processing data, from the regenerated data Rg2, based on the motion vector MV2. The addition processing unit 80 either adds the output ITg2 of the information expansion unit 8a to the predicted data Pg2 to output the resulting value as the regenerated data Rg2, or outputs the output ITg2 of the information expansion unit 8*l*, as it is, as the regenerated data Rg2, depending a coding mode of the low-resolution coded data Eg2.

In this case, the information expansion unit 8a comprises an inverse quantization circuit 24 for inversely quantizing the output Qg2 of the variable-length decoding circuit 64, and an inverse DCT circuit 25 for subjecting the output IQg2 of the inverse quantization unit 24 to the inverse DCT that transforms data in frequency region to data in spatial region, and outputting the expanded data ITg2. The predictive processing unit 8b comprises a frame buffer 26 for storing the output of the addition processing unit 80, i.e., the regenerated data Rg2, and a motion compensation circuit 27 for obtaining predicted data Pg2 corresponding to the target processing data, from the image data stored in the frame buffer 26, based on the motion vector MV2 from the variable-length decoding circuit 64 corresponding to the target processing data.

The first decoding unit 7 comprises a variable-length decoding circuit 63, an information expansion unit 7a, i.e., decompressive decoding means, a predictive processing unit 7b and an addition processing unit 70. The variable-length decoding circuit 63 subjects the target processing data in high-resolution coded data Eg1 corresponding to two-dimensional blocks that is a target of decoding, to variable-length decoding and outputs decoded data Qg1, i.e., quantization coefficients, while outputting a motion vector MV1 corresponding to the two-dimensional block. The information expansion 7a subjects the decoded data Qg1 to information expansion to generate expanded data ITg1. The predictive processing unit 7b generates predicted data Se1 corresponding to the target processing data, from the regenerated data Rg1, based on the motion vector MV1. The addition processing unit 70 either adds the output ITg1 of the information expansion data 7a to the predicted data Se1 to output the resulting value as the regenerated data Rg1, or outputs the output ITg1 of the information expansion unit 7a, as it is, as the regenerated data Rg1, depending a coding mode of the high-resolution coded data Eg1.

In this case, the information expansion unit 7a comprises an inverse quantization circuit 14 for inversely quantizing the output Qg1 of the variable-length decoding circuit 63, and an inverse DCT circuit 15 for subjecting the output IQg1 of the inverse quantization unit 14 to inverse DCT that transforms data in frequency region to data in spatial region, and outputting the expanded data ITg1. Further, the predictive processing unit 7b comprises a frame buffer 16 for storing the output of the addition processing unit 70, i.e., the regenerated data Rg1, a motion compensation circuit 17 for obtaining predicted data Pg1 corresponding to the target processing data, from the image data stored in the frame buffer 16, based on the motion vector MV1 from the variable-length decoding circuit 63 corresponding to the target processing data, and a selection switch 19b for selecting either the high-resolution predicted data Pg1 or the resolution converted signal CITg2, depending the coding mode, and outputting the selected data as the predicted data Se1 to the addition processing unit 70.

The operation is explained as follows.

Note that in the hierarchical decoding apparatus 102 so configured, the circuits 14 to 17 and 24 to 26 having the same reference numerals of FIG. 1 operate in the same way as the corresponding circuits in the hierarchical coding apparatus 101 according to the first embodiment shown in FIG. 1.

When the multiplexed bit stream MEg is input to the buffer 61 of the stream selection means 6, by the control of the CPU 62 the high-resolution coded data Eg1 and low-resolution coded data Eg2 in the multiplexed bit stream MEg are output to either the first decoding unit 7 or the second decoding unit 8, depending on the type of the stream, i.e., depending on of which frame each coded data corresponds to among I, B and P.

In this case, when only the low-resolution coded data Eg2 is decoded, all the streams corresponding to the low-resolution coded data Eg2 are transmitted to the second decoding unit 8. Thereafter, the variable-length decoding circuit 64 subjects the low-resolution coded data Eg2 to variable-length decoding to generate the decoded data Qg2. Further, the decoded data Qg2, i.e., quantization coefficients, is subjected to information expansion in the information expansion unit 8a to restore the image data ITg2 in spatial region.

Thereafter, the restored image data ITg2, i.e., expanded data, is subjected to necessary processing in the addition processing unit 80, depending on whether the data ITg2 corresponds to the I frame or another frame except the I frame.

That is, if the restored image data ITg2 corresponds to the I frame, the addition processing unit 80 outputs the regenerated data Rg2 as it is without carrying out addition. On the other hand, if the restored image data ITg2 does not correspond to the I frame, the addition processing unit adds the restored image data ITg2 to the corresponding predicted data Pg2 generated in the predictive processing unit 8b and outputs the resulting value as the regenerated data Rg2.

Figure 7:
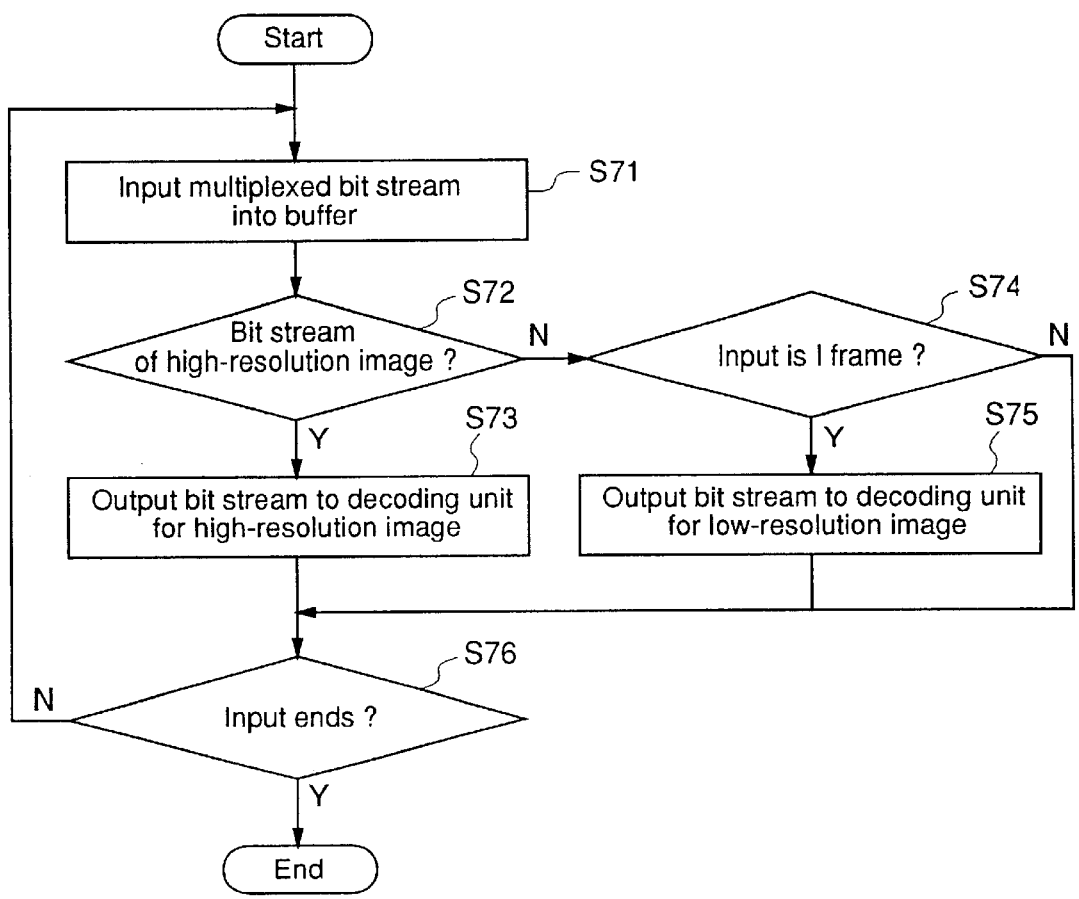
FIG. 7 is a diagram showing the flow of operation of a CPU of the hierarchical decoding according to the second embodiment.

Next, the decoding of the selected high-resolution coded data Eg1 will be explained. FIG. 7 is the flow of the operation of the CPU 62 in decoding the high-resolution coded data Eg1.

When the multiplexed bit stream MEg is input to the stream selection means 6, the selection of the low-resolution coded data Eg2 and the high-resolution coded data Eg1 is carried out in the following way according to the flow shown in FIG. 7.

That is, in step S71, the multiplexed bit stream MEg as it is divided into packets is input to the buffer 61 of the stream selection means 6, in step S72 it is decided whether each input packet of the coded data is the high-resolution coded data or not, and if it is the high-resolution coded data, this packet of the coded data is output to the first decoding unit 7 in step S73.

As opposed to this, if the result in step S72 decides that a packet of the input coded data is not the high-resolution coded data, the coded data is further decided whether to correspond the I frame or not in step S74. If the result in step S74 decides that the coded data does not correspond to the I frame, the CPU 62 decides whether the input of the coded data into the buffer 61 is finished or not (step 76). If the coded data corresponds to the I frame, the coded data is output to the second decoding unit 8.

As described above, since the coded data of low-resolution image corresponding to the I frame is necessary for decoding the coded data of high-resolution image corresponding to the I frame, only the coded data corresponding to the I frame is taken from the low-resolution coded data and supplied to the second decoding unit 8 in steps S72 and S74.

Although all the header of each packet is basically required to be read in order that the stream selection means 6 takes out only the coded data corresponding to the I frame, as described above it is possible to extract only the coded data corresponding to the I frame by the processing of which the amount of operation is small if a flag is added to the packet or the data of the packet itself is processed in a way to identify the packet that is stored in the coded data corresponding to the I frame.

Further, the stream selection means 6 extracts only the coded data corresponding to the I frame for the low-resolution coded data and does not supply the coded data corresponding to another frame to the second decoding unit 8, resulting in the removal of unnecessary operation in the second decoding unit 8. Note that the high-resolution coded data, as it is, is output to the first decoding unit 7.

In the second decoding unit 8, the coded data corresponding to the I frame is restored to image data in spatial region in the variable-length circuit 64 and the information expansion unit 8a, and the restored image data is subjected to resolution conversion in the resolution conversion circuit 30, and the resolution converted data CITg2 having the same resolution as that of the high-resolution image is output to the first decoding unit 7.

In the first decoding unit 7, for only the coded data corresponding to the I frame, the resolution converted data CITg2 is used as predicted data to generate the regenerated data Rg1. For decoding the coded data corresponding to another frame, the high-resolution coded data Eg1 is used.

As described above, in the second embodiment, when the high-resolution coded data Eg1 is decoded, the restored data corresponding to the coded data corresponding to the I frame in the low-resolution coded data Eg2 is used as predicted data for only the coded data corresponding to the I frame, so that the frame buffer 26 and motion compensation circuit 27 in the second decoding unit 8 for the low-resolution coded data Eg2 is not required to be used in decoding the high-resolution coded data Eg1, thereby making possible a reduction of the amount of operation and memory band width in the second decoding unit 8 to a great extent.

(Example of Variation 1 of Embodiment 2)

As a first variation of the second embodiment of this invention, a software hierarchical decoding apparatus which realizes, by software, the function of each circuit of the hierarchical decoding apparatus according to the second embodiment shown in FIG. 6, is described as follows.

Figure 8:
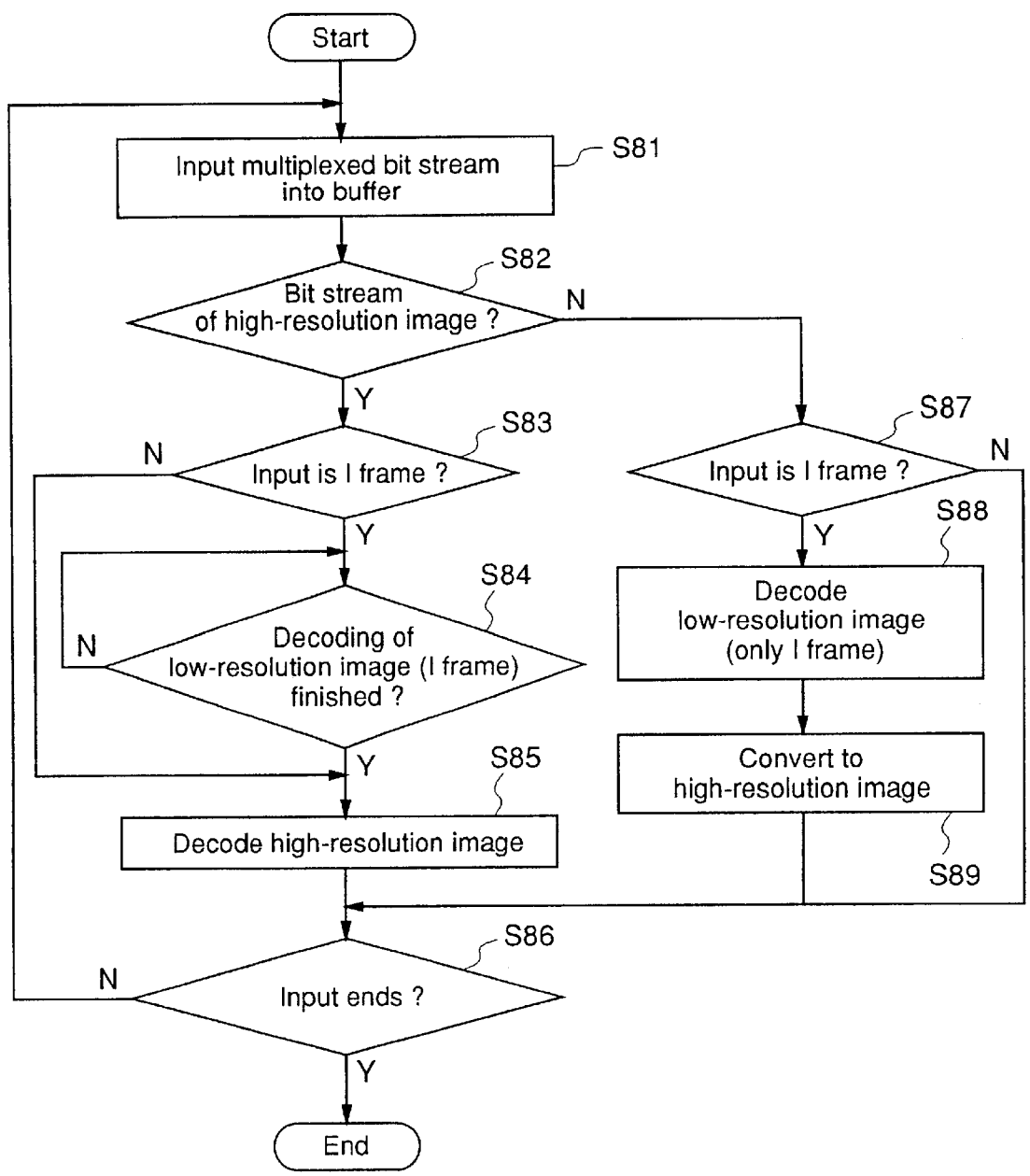
FIG. 8 is a diagram showing the flow of decoding by a hierarchical decoding apparatus, configured by software, according to a first variation of the second embodiment of the present invention.
Figure 9:
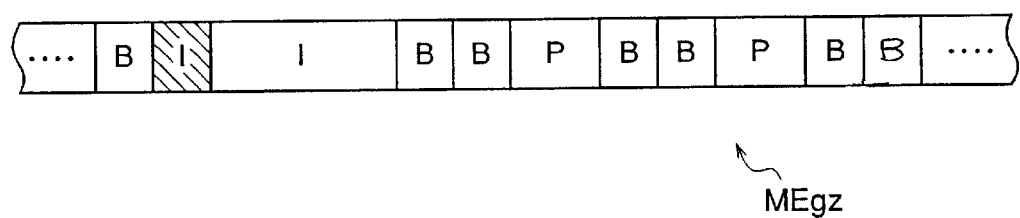
FIG. 9 is a diagram showing a data structure of a multiplexed bit stream MEgz which is input to the hierarchical decoding apparatus according to the first variation of the second embodiment.

FIG. 8 is a diagram showing the flow of the whole process of decoding by the software hierarchical decoding apparatus. FIG. 9 is a diagram showing a data structure of the multiplexed bit stream MEgz input to the software hierarchical decoding apparatus. The multiplexed bit stream MEgz contains the high-resolution coded data, i.e., a bit stream of the high-resolution image, and the low-resolution coded data, i.e., a bit stream of the low-resolution image, which is the hatched portion in the figure.

Further, a possible hierarchical decoding apparatus generating the multiplexed bit stream shown in FIG. 9 comprises only the first compressive coding unit in the hierarchical coding device shown in FIG. 17, and processes an image signal, in the low-resolution image signal, corresponding to the I frame, along with the high-resolution image signal, in the first compressive coding unit.

In the software hierarchical decoding, the high-resolution coded data and the low-resolution coded data are processed by time sharing. Therefore, the stream selection means 6 is required to output the high-resolution coded data and the low-resolution coded data by time sharing. In other word, since the low-resolution coded data corresponding to the I frame is required to be processed prior to the high-resolution coded data corresponding to the I frame, the low-resolution coded data corresponding to the I frame is first output to be subjected to decoding and resolution conversion.

Further, coded data corresponding to another frame except the I frame is not decoded for the low-resolution coded data. The high-resolution coded data corresponding to the I frame is subjected to decoding, after the low-resolution coded data corresponding to the I frame is completely decoded, while a signal obtained by subjecting the decoded data corresponding to the I frame to resolution conversion is used in the predictive processing.

The processing of the software hierarchical decoding apparatus is explained in detail according to the flow shown in FIG. 8, as follows.

Initially, when the multiplexed bit stream MEgz is input packet by packet to the buffer of the software hierarchical decoding apparatus in step S81, in next step S82 the input packets of the coded data (hereinafter referred to as input data) is decided whether to correspond to a stream of the high-resolution image or not.

If the result in step S82 decides that the input data does not correspond to the stream of the high-resolution image, it is decided in step S87 whether the input data corresponds to the I frame or not. If the result decides that the input data corresponds to the I frame, the input data is subjected to information expansion (step S88), and the resulting expanded data is subjected to resolution conversion to generate resolution converted expanded data (step S89). Thereafter, it is decided whether the input of the multiplexed bit stream to the buffer is finished or not (step S86). Further, if the result in step S87 decides that the input data does not correspond to the I frame, the processing is not carried out for the input data, and the processing of the CPU makes a transition to step S86.

On the other hand, as a result of the decision in step S82, if the input data corresponds to the stream of the high-resolution image, it is decided in step S83 whether the input data corresponds to the I frame or not. If a result of the decision is that the input data corresponds to the I frame, it is decided whether the information expansion of the low-resolution coded data corresponding to the I frame for the input data is completed or not (step S84). If the information expansion is completed, in step S85 the high-resolution coded data corresponding to the I frame is subjected to decoding. Further, if the result decides that the input data does not correspond to the I frame, the coded data in an high-resolution image corresponding to another frame except the I frame is subjected to decoding (step S85).

Thereafter, it is decided whether the input of the multiplexed bit stream to the buffer is finished or not (step S86). If it is not finished, steps S81 to S89 are repeated, while if it is finished, the decoding of the multiplexed bit stream ends.

Thus the foregoing software hierarchical decoding apparatus can decode the multiplexed bit stream containing the high-resolution coded data and the low-resolution coded data with a reduction of the amount of operation.

(Example of Variation 2 of Embodiment 2)

As a second variation of the second embodiment of this invention, another software hierarchical decoding apparatus which realizes, by software, the function of each circuit of the hierarchical decoding apparatus according to the second embodiment shown in FIG. 6, is described as follows.

Figure 10:
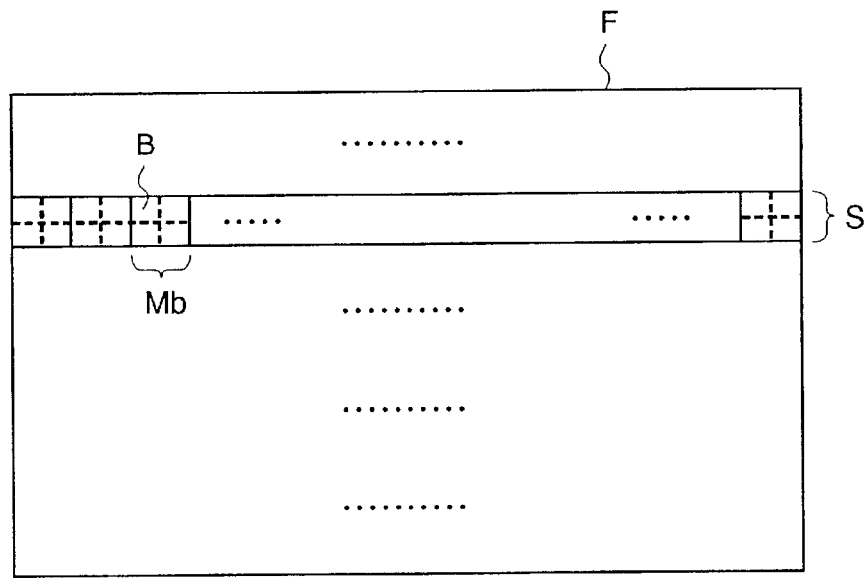
FIG. 10 is a diagram for explaining a hierarchical coding apparatus according to a second variation of the second embodiment, showing a concept about a block which is a processing unit in a MPEG-based method.
Figure 11:
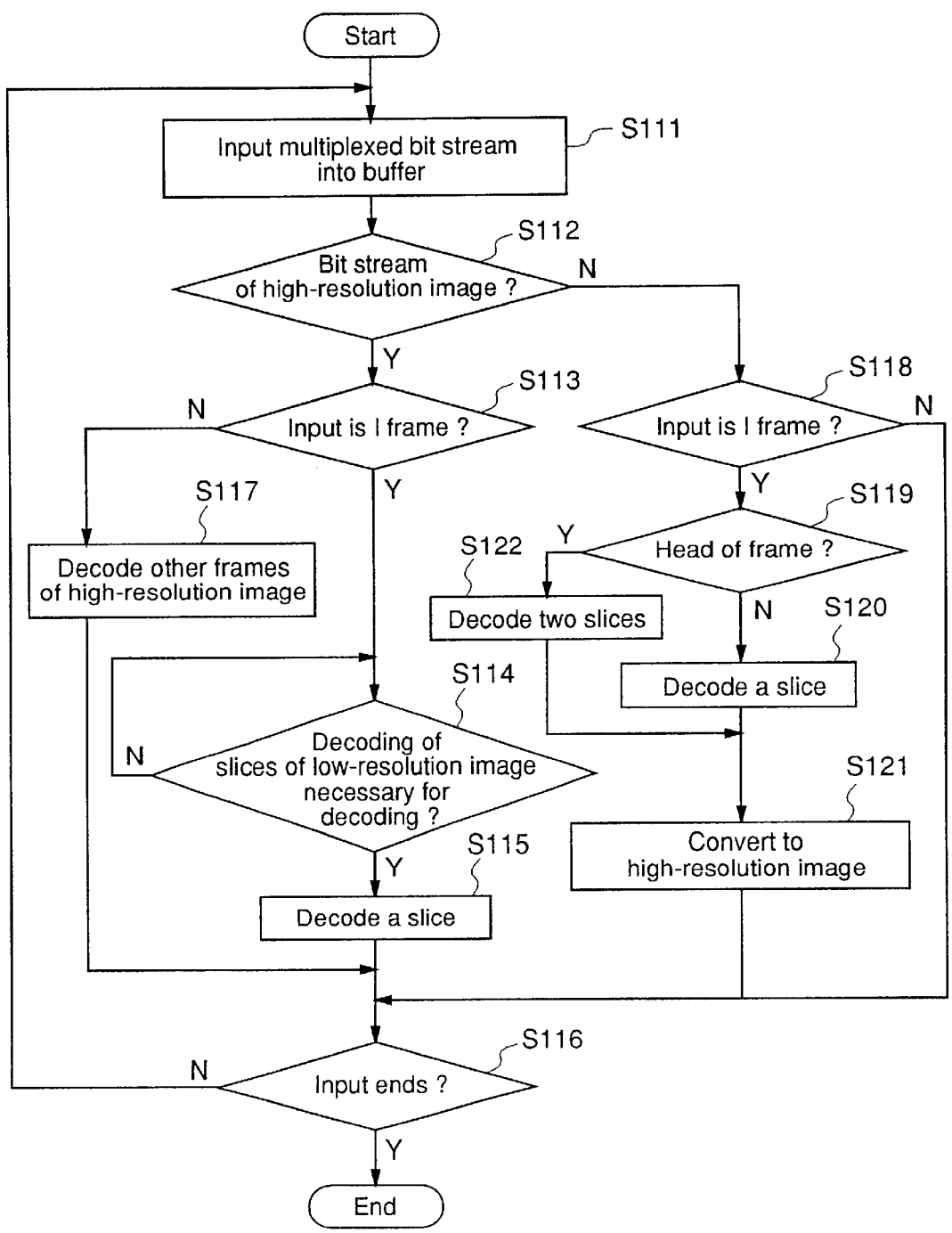
FIG. 11 is a diagram showing the flow of hierarchical decoding by a software hierarchical decoding apparatus according to the second variation of the second embodiment.

FIG. 10 and FIG. 11 are diagrams for explaining the software hierarchical decoding apparatus. FIG. 10 is a diagram for showing the concept of a block which is a processing unit in the MPEG-based method.

In the figure, F is an image equivalent to a frame. A frame of the image F comprises plural slices S which are minimum units in variable-length decoding. A slice S comprises plural microblocks Mb which are units for motion compensation. Further, a microblock Mb comprises four blocks B which are units for DCT.

As is a typical example, when a frame of image comprises 720 pixels×480 lines, that is, 720 pixels in the horizontal direction and 480 lines in the vertical direction are arranged, a block B comprises 8 pixels×8 lines, that is, 8 pixels in the horizontal direction and 8 lines in the vertical direction are arranged, and a microblock Mb comprises 2×2 blocks, that is, 2 blocks in the horizontal direction and 2 blocks in the vertical direction are arranged. Further, a slice S comprises 45 microblocks Mb, and a frame F comprises 30 slices S.

As described above, since variable-length coding is carried out slice by slice, it is possible to alternatively decode, slice by slice, the low-resolution coded data and the high-resolution coded data. However, concerning the low-resolution coded data, one that has been subjected to expansion is required to be subjected to resolution conversion, and therefore as much a number of slices of the coded data as the number of lines used in resolution conversion, are required to be decoded.

FIG. 11 is a diagram showing the flow of the hierarchical decoding by the software hierarchical decoding apparatus. In the flow, a filter having two taps is assumed to be used as the filter in resolution conversion. Therefore, for the header of each frame of the low-resolution coded data, two slices are continuously decoded, and for the following coded data, the decoding is carried out for each slice.

Note that when a filter having more taps is applied to the resolution conversion, more slices are continuously decoded for the header of each frame of the low-resolution coded data.

In the software decoding apparatus so configured, all the low-resolution regenerated data corresponding to the I frame are not required to be retained for decoding the high-resolution coded data corresponding to the I frame. For example, only two slices of data are needed for the low-resolution regenerated data corresponding to the I frame which is stored in a memory, whereby the efficiency of usage of the memory is improved.

The processing of the software hierarchical decoding apparatus of the second variation is explained in detail according to the flow shown in FIG. 11, as follows.

Initially, when the multiplexed bit stream MEgz is input packet by packet to the buffer of the software hierarchical decoding apparatus in step S111, in next step S112 the input packets of the coded data (hereinafter referred to as input data) are decided whether to correspond to a stream of the high-resolution image or not.

If a result of the decision in step S112 is that the input data does not correspond to the stream of the high-resolution image, it is decided in step S118 whether the input data corresponds to the I frame or not. If the result decides that the input data corresponds to the I frame, it is decided whether the input data corresponds to the header of a frame or not (step S119). If it is the header of a frame, two slices of the input data are continuously decoded (step S122). On the other hand, if the input data is not the header of a frame, only a slice of the input data is decoded (step S120). Following to this, the restored data obtained by this processing is subjected to resolution conversion to generate resolution converted restored data (step S121). Thereafter, it is decided whether the input of the multiplexed bit stream to the buffer is finished or not (step S116). Further, if a result of the decision in step S118 is that the input data does not correspond to the I frame, the processing is not carried out for the input data, and the processing of the CPU makes a transition to step S116.

On the other hand, as a result of the decision in step S112, if the input data corresponds to the stream of the high-resolution image, it is decided in step S113 whether the input data corresponds to the I frame or not. If the result decides that the input data corresponds to the I frame, it is decided whether the decoding of the low-resolution coded data corresponding to the I frame for the input data is completed or not (step S114). If the decoding is completed, in step S115 only a slice of the high-resolution coded data corresponding to the I frame is subjected to decoding. Further, if a result of the decision in step S113 is that the input data does not correspond to the I frame, the coded data in high-resolution corresponding to another frame except the I frame is subjected to decoding in step S117.

Thereafter, it is decided whether the input of the multiplexed bit stream to the buffer is finished or not (step S116). If it is not finished, steps S111 to S112 are repeated, while if it is finished, the decoding of the multiplexed bit stream ends.

Although the case that the hierarchical decoding is carried out by software in the first variation and second variation of the second embodiment, the hierarchical decoding of each variation is not limited to the foregoing case by software. When the decoding unit for the low-resolution coded data and the decoding unit for the high-resolution coded data share a hardware, the similar method of the hierarchical decoding apparatus of each variation, i.e., the time sharing for the high-resolution and low-resolution coded data, can be used. In this case, if the steam selection means outputs the high-resolution coded data and the low-resolution coded data by time sharing, or, if the packet in the multiplexed bit stream is divided into slice units in the stream selection means, and the slice of the coded data corresponding to the low-resolution image and the slice of the coded data corresponding to the high-resolution image are alternatively supplied to the decoding means, the scale of a hardware and the amount of a memory can be reduced.

Further, the second embodiment and the variations show that the hierarchical decoding apparatuses receive the multiplexed bit stream, but hierarchical decoding apparatuses are not limited to those. For example, when image data is used on a communication network such as internet, there is a case that a stream of a high-resolution image, i.e., coded data, and a stream of a low-resolution, i.e., coded data, are transmitted without being multiplexed. In such a case, only if the operation for extracting the high-resolution coded data and low-resolution coded data from a bit stream is omitted in the hierarchical decoding apparatus, other processes in the hierarchical decoding are carried out in the same way when the multiplexed bit stream is input.

It should be noted that although in the second embodiment and the variations a signal corresponding to the I frame is selected from the resolution converted signal CITg2 obtained by subjecting the expanded data ITg2 to resolution conversion, a resolution converted signal corresponding to the I frame may be obtained by selecting expanded data corresponding to the I frame from the expanded data ITg2 and thereafter subjecting the selected expanded data to resolution conversion.

[Embodiment 3]

Figure 12:
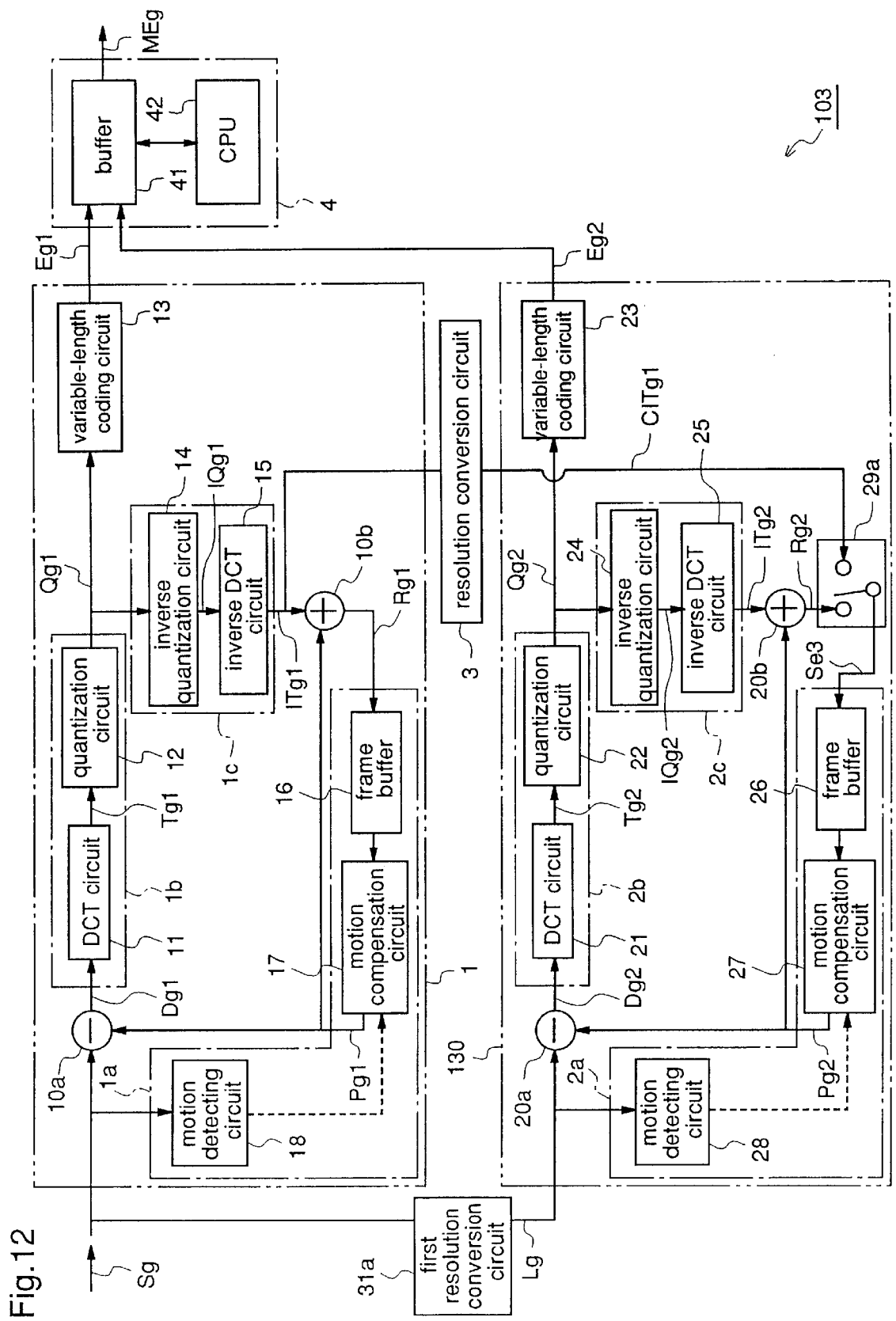
FIG. 12 is a block diagram for explaining a hierarchical coding apparatus according to a third embodiment of the present invention.
Figure 13:
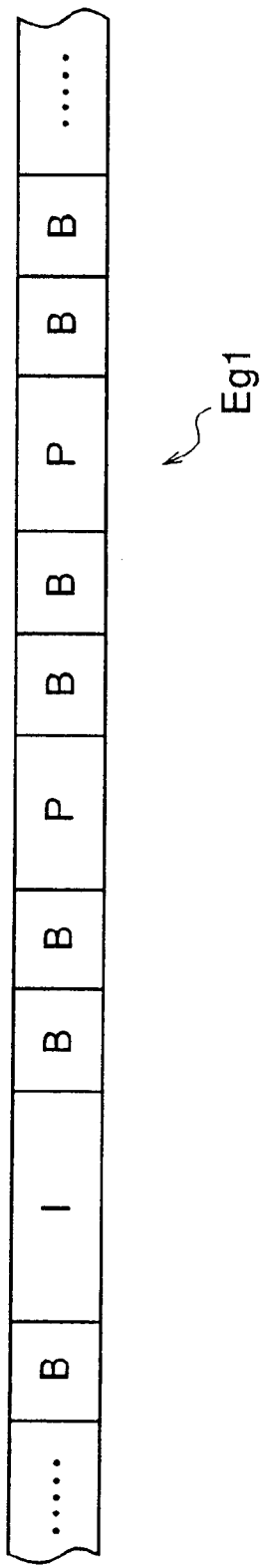
FIG. 13(a) is a diagram showing a data structure of an output of a first compressive coding unit 1 of the hierarchical coding apparatus according to the third embodiment.
FIG. 13(b) is a diagram showing a data structure of an output of a second compressive coding unit 1 of the hierarchical coding apparatus according to the third embodiment.
Figure 13:
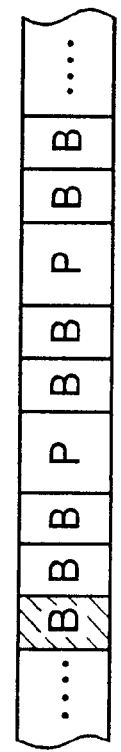
Figure 14:
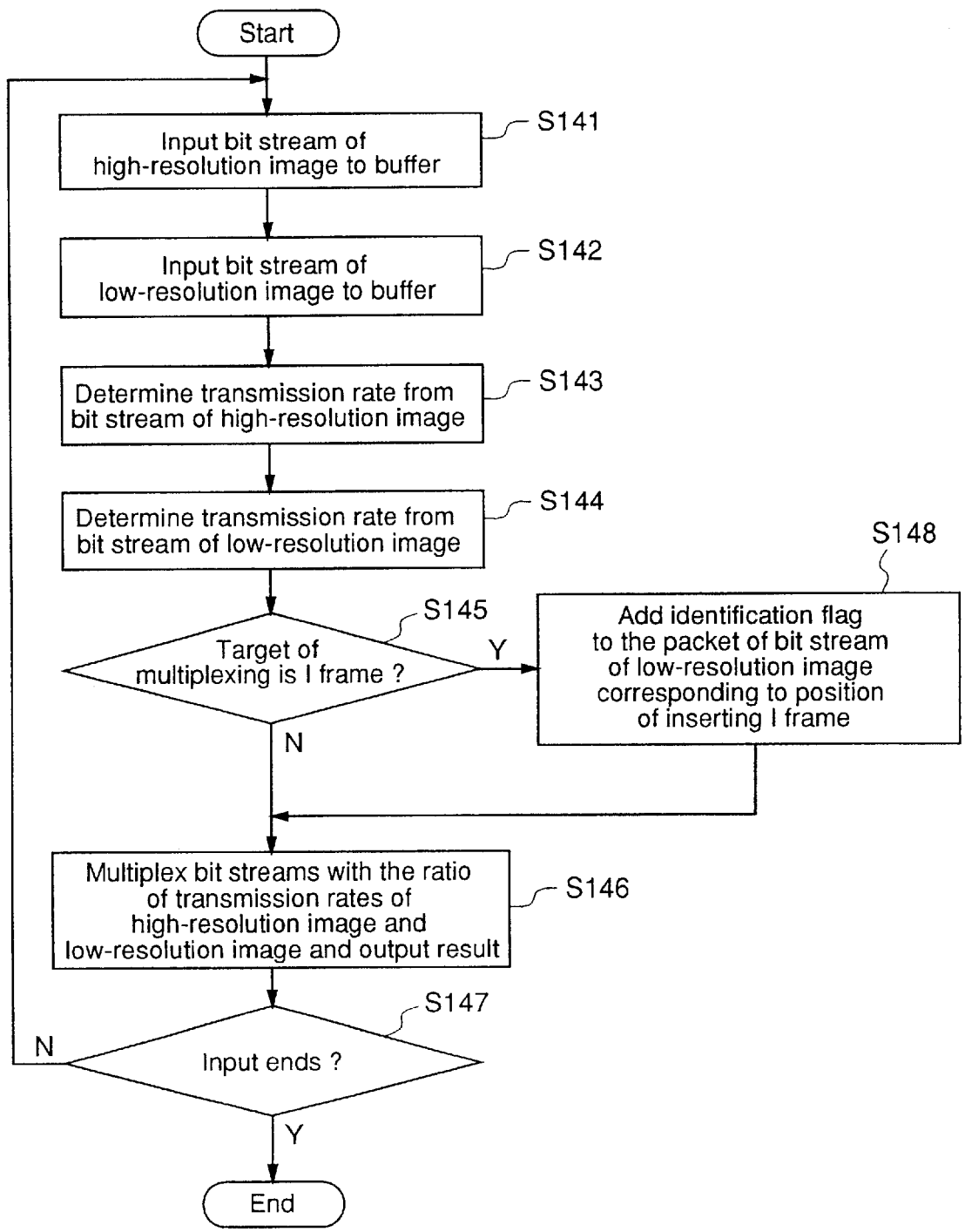
FIG. 14 is a diagram showing the flow of multiplexing by the hierarchical coding apparatus according to the third embodiment.

FIG. 12 to FIG. 14 are diagrams for explaining a hierarchical coding apparatus and hierarchical coding method according to a third embodiment of the present invention. FIG. 12 is a block diagram showing the configuration of the hierarchical coding apparatus according to the third embodiment.

The hierarchical coding apparatus according to the third embodiment receives a digital image signal Sg as an input, and subjects the image signal Sg to hierarchical coding. The hierarchical coding apparatus 103, as similar to the conventional hierarchical coding apparatus 200, comprises a first compressive coding unit 1 for compressively coding the digital image signal Sg, a first resolution conversion circuit 31a for subjecting the digital image signal Sg to resolution conversion and outputting a low-resolution image signal Lg, a second compressive coding unit 130 for compressively coding the low-resolution image signal Lg, and a multiplexing circuit 4a for multiplexing the output data of each compressive coding unit. In this case, the multiplexing circuit 4a comprises a buffer 41 for retaining the each coded data, and a CPU 42a for multiplexing both of the coded data.

In this case, the first resolution conversion circuit 31a has such a configuration that the image data in a digital image signal Sg corresponding to the I frame is not subjected to resolution conversion and only the low-resolution image data corresponding to another frame except the I frame is output.

Further, before being input to the hierarchical coding apparatus 103, the digital image signal Sg (hereinafter also referred to as a high-resolution image signal) is divided into frames, and each frame is divided into coding units. In this case, the first compressive coding unit 1 has thoroughly the same configuration as that of the conventional hierarchical coding apparatus 200.

The hierarchical coding apparatus 103 further comprises a resolution conversion circuit 33 for subjecting regenerated data Rg1, which is generated in the first compressive coding unit 1, to resolution conversion in a way that its resolution becomes equal to that of the low-resolution image signal Lg. The resolution conversion circuit 33 outputs data CRg1 to the second compressive coding unit 130.

The second compressive coding unit 130, as similar to the conventional hierarchical coding apparatus 200, comprises a predictive processing unit 2a, a subtraction processing unit 20a, an information compression unit 2b, i.e., compressive coding means, a variable-length coding circuit 23, an information expansion unit 2c, i.e., decompressive decoding means, and an addition processing unit 20b. The prediction processing unit 2a generates predicted data Pg2 for the target processing signal. The subtraction processing unit 20a obtains prediction error data Dg2 depending on the coding mode. The information compression unit 2b subjects the output Dg2 of the subtraction processing unit 20a to information compression. The variable-length coding circuit 23 subjects the output Qg2 of the information compression unit 2b to variable-length coding. The information expansion unit 2c subjects the output Qg2 of the information compression unit 2b to information expansion. The addition processing unit 20b adds the output ITg2 of the information expansion unit 2c to the predicted data Pg2 depending on the coding mode. In this case, the predictive processing unit a, the information compression unit 2b and the information expansion unit 2c have thoroughly the same configurations as those of the conventional hierarchical coding apparatus 200.

Further, in the third embodiment, the second compressive coding unit 130 further comprises a selection switch 29a for selecting the output CRg1 of the resolution conversion circuit 33 and an output Rg of the addition processing unit 20b. A selected output Se3 of the selection switch 29a is stored in a frame buffer 26 of the predictive processing unit 2a.

Further, FIG. 13(a) shows a data structure of the bit stream Eg1 of a high-resolution image output from the first compressive code unit 1. FIG. 13(b) shows a data structure of the bit stream Eg2 of a low-resolution image output from the second compressive code unit 2.

Next, the operation will be explained.

When the hierarchical coding apparatus 103 receives the digital image signal Sg as it is separated into the frame units, as a video signal, initially, the first resolution conversion circuit 31a subjects the image signal Sg to resolution conversion in a way to make its vertical and horizontal resolutions a half of the respective original resolutions, and outputs the low-resolution image signal Lg.

Thereafter, the low-resolution image signal Lg is subjected to coding in the second compressive coding unit 130. At the same time, the digital image signal Sg, i.e., a high-resolution image signal, is subjected to coding in the first compressive coding unit 1.

The first compressive coding unit 1, as similar to the conventional hierarchical coding apparatus 200, subjects the high-resolution image signal Sg to compressive coding and outputs high-resolution coded data Eg1 shown in FIG. 13(a). In this case, as shown in FIG. 13(a), a high-resolution image signal Sg corresponding to the I frame is not subjected to predictive coding. That is, the compressive coding of the image signal of the I frame is carried out without referring to the data of other frames, as similar to the case that the hierarchical coding is not carried out.

Further, the low-resolution image data corresponding to the I frame is not supplied to the second compressive coding unit 130, but only the image data corresponding to another frame except the I frame is supplied to the second compressive coding unit 130 from the first resolution conversion unit 31a. Therefore, in the second compressive coding unit 130, the selection switch 29a switches the output Rg2 of the addition processing unit 20b an the output CRg1 of the resolution conversion circuit 33 appropriately to be stored in the frame buffer 26, and the low-resolution image data corresponding to the P frame or B frame is subjected to predictive coding, using resolution converted restored data CRg1 obtained by subjecting the high-resolution restored data to resolution conversion.

Next, the multiplexing of the high-resolution coded data and the low-resolution coded data by the multiplexing circuit 4 will be briefly described.

FIG. 14 is a diagram showing the flow of the multiplexing by the CPU 42a in the multiplexing circuit 4a.

That is, in step S141 and S142, by the control of the CPU 42a, the high-resolution coded data Eg1, i.e., a bit stream of a high-resolution image, and the low-resolution coded data Eg2, i.e., a bit stream of a low-resolution image, are input to the buffer 41 of the multiplexing circuit 4. Next, in steps S143 and S144, the operation of the CPU 42a determines the transmission rate of the high-resolution coded data and the transmission rate of the low-resolution coded data from the respective bit streams.

Thereafter, the CPU 42a decides whether the coded data which is a target of multiplexing corresponds to the I frame or not (step S145). As a result of the decision, if the coded data that is a target of multiplexing does not correspond to the I frame, by the control of the CPU 42a the high-resolution coded data and low-resolution coded data in the buffer 41 are multiplexed with the ratio of the transmission rates to be output (step S146).

On the other hand, as a result of the decision in step S145, if the coded data that is a target of multiplexing corresponds to the I frame, by the control of the CPU 42a, the packet of a low-resolution bit stream that is positioned where the coded data of the I frame should be inserted, is added with an identification flag (step S148).

Thereafter, the process by the CPU 42a goes to step S146, and finally, it is decided whether the input of the coded data to the buffer 41 is finished or not (step S147). If it is finished, the multiplexing ends, while if not finished, the processes by the CPU 42a in steps S141 to S147 are repeated.

As described above, in the flow shown in FIG. 14, the identification flag is added to the packet located in the position of inserting an I frame, because the hierarchical coding apparatus 103 does not output the low-resolution coded data corresponding to the I frame, and thus, the hierarchical decoding apparatus corresponding to the hierarchical coding apparatus 103 is required to insert and present the image data corresponding to the I frame in the regenerated data in regenerating the low-resolution image. Note that although in FIG. 14 the identification flag is added to the packet located in the position of inserting image data of the I frame, a packet either before or immediately after inserting an I frame, if prescribed at the time of transmission, may be used as the packet which is added with the identification flag.

Further, in the decoding side, a thing to know is the position of inserting image data of the I frame in the low-resolution regenerated data, so that if the number of consecutive B frames is prescribed in advance as shown in FIG. 13(b), when the packets corresponding to the B frames continues more times than the prescribed value, the packet hatched in FIG. 13(b) can be detected as a position where data corresponding to the I frame or a packet corresponding to the I frame is originally inserted. However, in this case, when the number of consecutive B frames is changed by transmission error or edit operation or the like, detection error occurs, which is a drawback. The solution to this is to use a method of identifying an appropriate position of inserting an I frame depending on the type of a transmission system or a storage medium.

Further, when there is a spare portion of storing the low-resolution coded data in a bit stream or in the header of a packet, the flag of identifying the I frame shown in the first embodiment, or the bit number or packet number from the head of a bit stream indicating the position of the flag of identifying the I frame shown in the third embodiment, can be added in the header, putting them together or distributing them into several positions.

In the hierarchical coding apparatus 103 according to the third embodiment having such a configuration, since the predictive coding of low-resolution image data corresponding to the P or B frame is carried out using the data obtained by subjecting the high-resolution restored data corresponding to the I frame to resolution conversion, the coded data corresponding to the I frame in a low-resolution bit stream that has the most amount of data, is not required to be transmitted, thereby reducing the total bit rate in transmitting both of the coded data of the high-resolution and low-resolution data.

It should be noted that although in the third embodiment a signal corresponding to the I frame is selected from the resolution converted signal CITg1 obtained by subjecting the expanded data ITg1 for the high-resolution side to resolution conversion, a resolution converted signal corresponding to the I frame may be obtained by selecting expanded data corresponding to the I frame from the expanded data ITg1 and thereafter subjecting the selected expanded data to resolution conversion.

[Embodiment 4]

Figure 15:
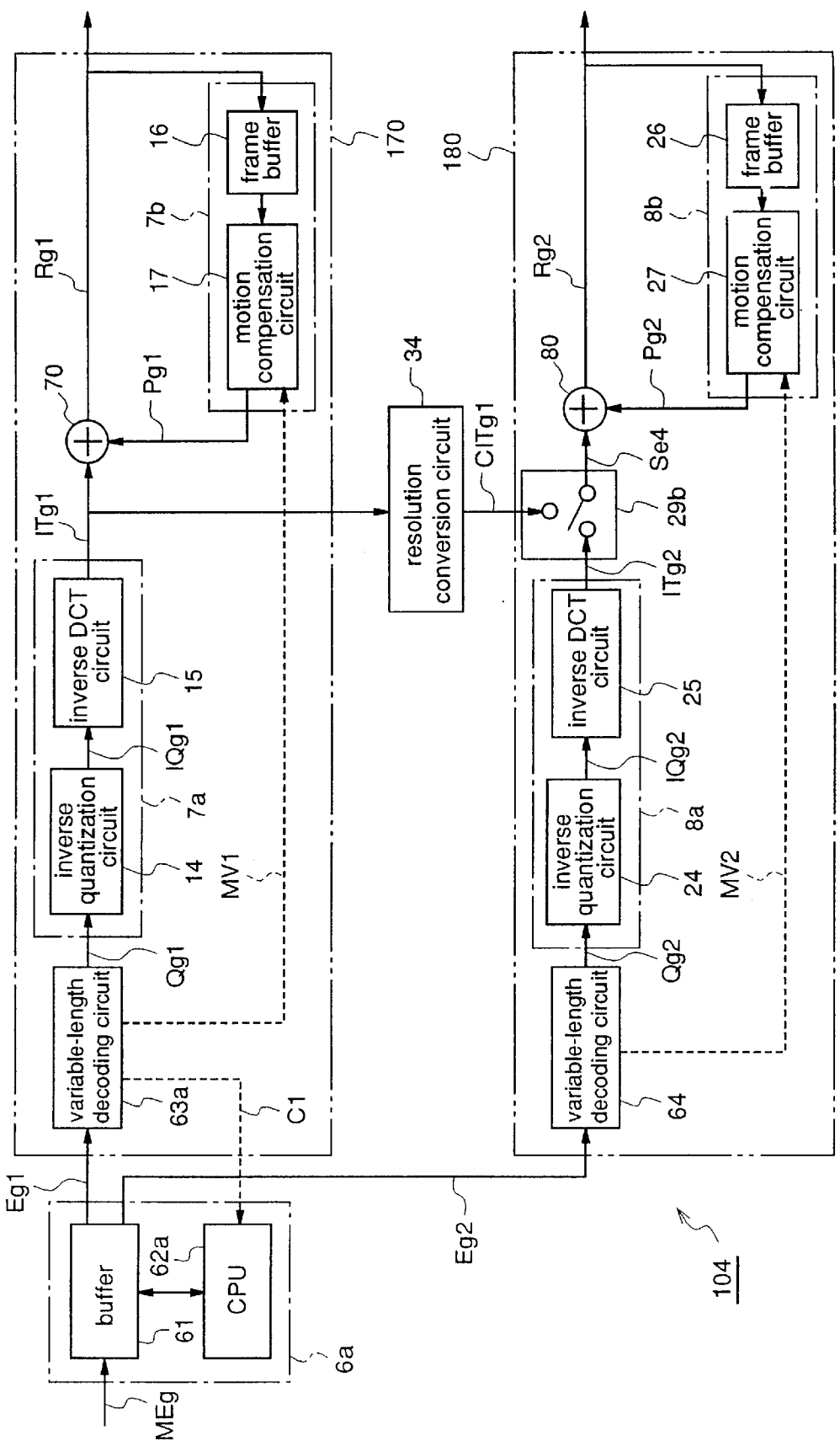
FIG. 15 is a block diagram for explaining a hierarchical decoding apparatus according to a fourth embodiment of the present invention.

FIG. 15 is a block diagram for explaining a hierarchical decoding apparatus and hierarchical decoding method according to a fourth embodiment of this invention.

The hierarchical decoding apparatus 104 according to the fourth embodiment has such a configuration that the multiplexed bit stream MEg output from the hierarchical coding apparatus according to the third embodiment shown in FIG. 12 is decoded.

That is, the hierarchical decoding apparatus 104 comprises stream selection means 6a, a first decoding unit 170, a resolution conversion circuit 34 and a second decoding unit 180. The stream selection means 6a receives the multiplexed bit stream Meg from the hierarchical coding 103, selects the necessary high-resolution coded data Eg1 and necessary low-resolution coded data Eg2 from the multiplexed bit stream Meg according to a control signal C1 to be output. The first decoding unit 170 subjects the selected high-resolution coded data Eg1 to decoding and outputs regenerated data Rg1. The resolution conversion circuit 34 subjects the signal ITg1, that is halfway through the processing in the first decoding unit 170, to resolution conversion and outputs a resolution converted signal CITg1. The second decoding unit 180 subjects the selected low-resolution coded data Eg2 to decoding according to the resolution converted signal CITg1 and outputs regenerated data Rg2. The stream selection means 6a comprises a buffer 61 for temporarily storing the multiplexed bit stream MEg, and a CPU 62a for selecting the necessary coded data Eg1 and Eg2 from the multiplexed bit stream MEg stored in the buffer 61 according to the control signal C1.

The first decoding unit 170 comprises a variable-length decoding circuit 63a, an information expansion unit 7a, i.e., decompressive decoding means, a predictive processing unit 7b and an addition processing unit 70. The variable-length decoding circuit 63a subjects the target processing data in high-resolution coded data Eg1 corresponding to two-dimensional blocks that is a target of decoding, to variable-length decoding and outputs decoded data Qg1, i.e., quantization coefficients, while outputting a motion vector MV1 corresponding to the two-dimensional block. The information expansion 7a subjects the decoded data Qg1 to information expansion to generate expanded data ITg1. The predictive processing unit 7b generates predicted data Pg1 corresponding to the target processing data, from the regenerated data Rg1, based on the motion vector MV1. The addition processing unit 70 either adds the output ITg1 of the information expansion unit 7a to the predicted data Pg1 to output the resulting value as the regenerated data Rg1, or outputs the output ITg1 of the information expansion unit 7a, as it is, as the regenerated data Rg1, depending a coding mode of the high-resolution coded data Eg1.

In this case, the variable-length decoding circuit 63a has such a configuration that when the decoding of the coded data corresponding to the I frame is completed, the control signal C1 is output to the CPU 62 of the multiplexing circuit 6a. Further, the information expansion unit 7a and the predictive processing unit 7b have thoroughly the same configurations as those of the hierarchical decoding apparatus 102 according to the second embodiment. The information expansion unit 7a comprises the inverse quantization circuit 14 and the inverse DCT circuit 15. The predictive processing unit 7b comprises the frame buffer 16 and the motion compensation circuit 17.

Further, the second decoding unit 180 comprises a variable-length decoding circuit 64, an information expansion unit 8a, i.e., decompressive coding means, a selection switch 29b, a predictive processing unit 8b and an addition processing unit 80. The variable-length decoding circuit 64 subjects the target processing data in low-resolution coded data Eg2 corresponding to two-dimensional blocks that is a target of decoding, to variable-length decoding and outputs decoded data Qg2, i.e., quantization coefficients, while outputting a motion vector MV2 corresponding to the two-dimensional block. The information expansion 8a subjects the decoded data Qg2 to information expansion to generate expanded data ITg2. The selection switch 29b selects either the output CITg1 of the resolution conversion circuit 34 or the output ITg2 of the information expansion 8a. The predictive processing unit 8b generates predicted data Pg2 corresponding to the target processing data, from the regenerated data Rg2, based on the motion vector MV2. The addition processing unit 70 either adds an output Se4 of the selection switch 29b to the predicted data Pg2 to output the resulting value as the regenerated data Rg2, or outputs the output Se4 of the selections witch, as it is, as the regenerated data Rg2, depending a coding mode of the low-resolution coded data Eg2.

In this case, the information expansion unit 8a and the predictive processing unit 8b have the same configurations as those in the second embodiment. The information expansion 8a comprises the inverse quantization circuit 24 and the inverse DCT circuit 25. The information processing unit 8b comprises the frame buffer 26 and the motion compensation circuit 27.

The operation is explained as follows.

Note that in the hierarchical decoding apparatus 104 so configured, the circuits 14 to 17 and 24 to 26 having the same reference numerals of FIG. 12 operate in the same way as the corresponding circuits in the hierarchical coding apparatus 103 according to the third embodiment shown in FIG. 12.

When the multiplexed bit stream MFg is input to the buffer 61 of the stream selection means 6a, by the control of the CPU 62a the high-resolution coded data Eg1 and low-resolution coded data Eg2 in the multiplexed bit stream MEg are output to either the first decoding unit 170 or the second decoding unit 180, depending on the type of a stream, i.e., depending on of which frame each coded data is among I, B and P.

Thereafter, the variable-length decoding circuit 63a subjects the high-resolution coded data Eg1 to variable-length decoding to generate the decoded data Qg1. Thereafter, when only the regeneration of the low-resolution image is carried out, the control signal C1 is output from the variable-length decoding circuit 63a to the stream selection means 6a at the time that the decoding of the coded data corresponding to the I frame of a high-resolution image is completed. Thus, the stream selection means 6a stops outputting the high-resolution coded data to the first decoding unit 170 until the stream selection means receives next coded data corresponding to the I frame of a high-resolution image.

Thereafter, the decoded data Qg1, i.e., quantization coefficients, output from the variable-length decoding circuit 63a is subjected to information expansion in the information expansion unit 7as to be restored to be the image data ITg1 in spatial region. The restored image data ITg1, i.e., restored data, is subjected to resolution conversion in the resolution conversion circuit 34 to be output as the resolution converted restored data CITg1 to the second decoding unit 180.

Further, when the high-resolution image is regenerated along with the low-resolution image, coded data corresponding to the B or P frame is successively input to the variable-length decoding circuit 63a, following to the coded data corresponding to the I frame. Thereafter, the predictive processing unit 7b generates the predicted data, the addition processing unit 70 adds the restored data ITg1 and the predicted data Pg1, and the high-resolution regenerated data Rg1 is output.

Further, in the second decoding unit 180, when the low-resolution coded data Eg2 in input to the variable-length decoding circuit 64, the low-resolution coded data Eg2 is subjected to variable-length decoding to generate the decoded data Qg2, and further, the decoded data Qg2, i.e., quantization coefficients, is subjected to information expansion in the information expansion unit 8a to be restored to be the image data ITg2, i.e., restored data, in spatial region.

Thereafter, if the restored data ITg2 corresponds to the I frame, the selection switch 29b selects the output CITg1 of the resolution conversion circuit 34, and the addition processing unit 80 outputs the CITg1 as it is, as the regenerated data Rg2. On the other hand, if the restored data ITg2 corresponding to another frame except the I frame, the selection switch 29 selects the output ITg2 of the information expansion unit 8a, and the addition processing unit 80 adds the CITg1 and the predicted data Pg2 and outputs the resulting value as the regenerated data Rg2.

Further, at this time, the predictive processing unit 8b stores the regenerated data Rg2 in the frame buffer 26, and generates the predicted data Pg2 from image data in the frame buffer 26, based on the motion vector MV2 from the motion compensation circuit 27.

As described above, in the fourth embodiment, the variable-length decoding circuit 63a of the first decoding unit 170 outputs the control signal C1 at the time that the decoding of the coded data corresponding to the I frame is completed, and the stream selection means 6a, according to the control signal C1, stops outputting the coded data to the first decoding unit 170 until the stream selection means 6a receives the high-resolution coded data corresponding to the I frame, thereby making it possible to regenerate the low-resolution image based on the multiplexed bit stream that is output from the hierarchical coding apparatus according to the third embodiment and does not contain the coded data corresponding to the I frame of a low-resolution image.

Further, in the fourth embodiment, although at the time that the variable-length decoding of the I frame of a high-resolution image the variable-length decoding circuit sends the control signal to the stream selection means to stop the input of the coded data to the variable-length decoding circuit, the control signal C1 is not required as a signal stopping the input to the stream selection means from the variable-length decoding circuit 63a when the identification flag indicating the I frame, as described about the first embodiment, is added to the packet corresponding to the I frame in the hierarchical coding apparatus, because the stream selection means can detect the packet corresponding to the I frame according to the identification flag.

Further, when such an identification flag is added to the packet corresponding to the I frame, the process of identifying the packet corresponding to the I frame is omitted in the variable-length decoding circuit 63a, resulting in a reduction of the amount of operation.

Furthermore, the configuration of the first embodiment in which the identification flag is added to the I frame may be combined with the configuration of the fourth embodiment in which the variable-length decoding unit 63a outputs the control signal C1 to the stream selection means at the time that the decoding of the I frame is completed.

(Example of Variation of Embodiment 4)

As a variation of the fourth embodiment of this invention, a software hierarchical decoding apparatus which realizes, by software, the function of each circuit of the hierarchical decoding apparatus according to the fourth embodiment shown in FIG. 15, is described as follows.

Figure 16:
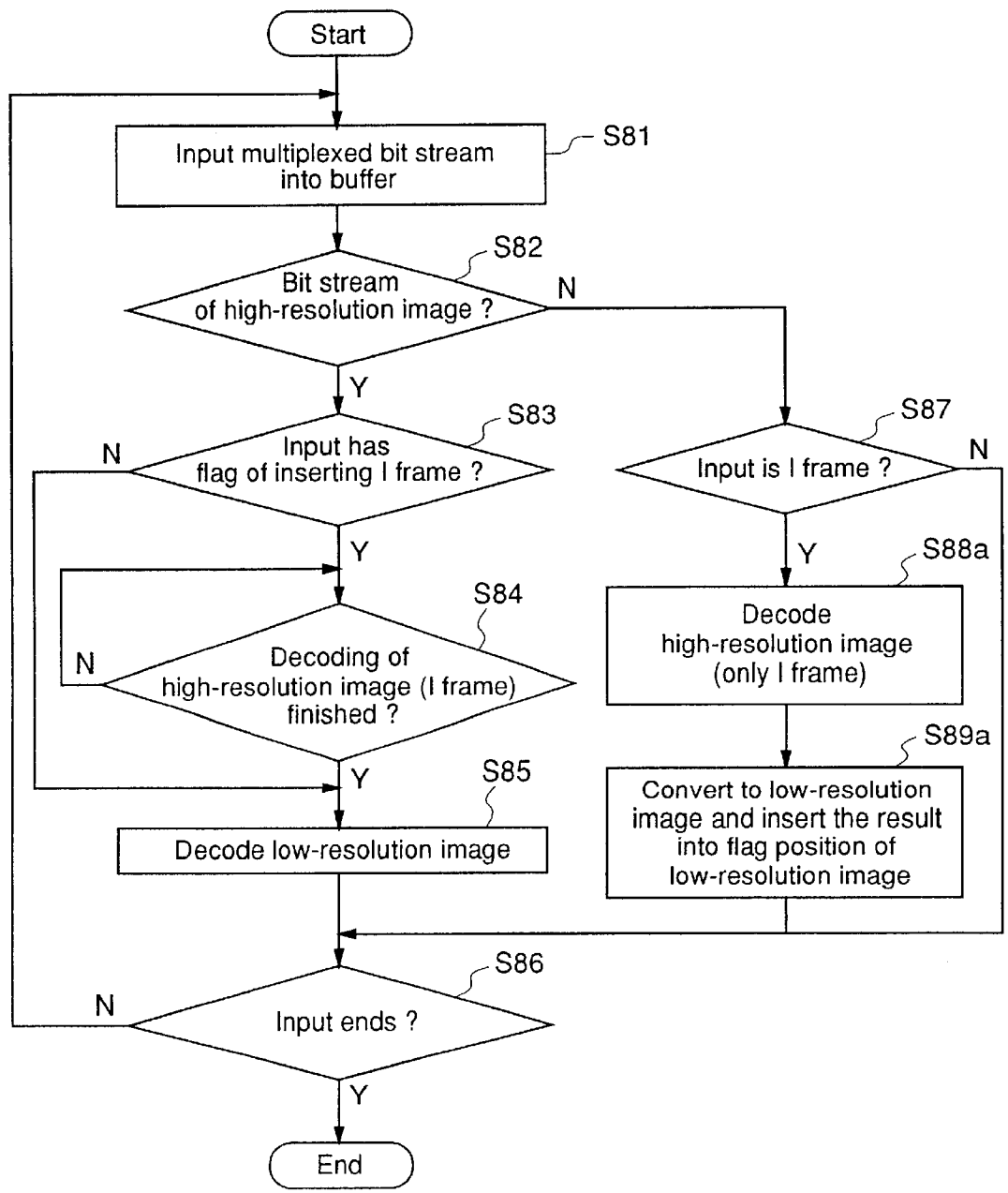
FIG. 16 is a diagram showing the flow of decoding by the hierarchical decoding apparatus according to the fourth embodiment.

FIG. 16 is a diagram showing the flow of the whole process of decoding by the software hierarchical decoding apparatus.

In the software hierarchical decoding apparatus according to the variation of the fourth embodiment, as similar to the hierarchical decoding apparatus according to the variation of the second embodiment, the decoding of the high-resolution coded data and the decoding of the low-resolution coded data are processed by time sharing.

That is, in this software hierarchical decoding apparatus, when the low-resolution is regenerated, the decoded data corresponding to the I frame of a high-resolution image is required to be subjected to decoding and resolution conversion before the coded data corresponding to the P or B frame of a low-resolution image is decoded.

Further, in this high-resolution decoding apparatus, the position in low-resolution regenerated data of inserting the low-resolution restored data corresponding to the I frame obtained from the high-resolution coded data is determined by the inserted flag shown in FIG. 14.

The processing of the software hierarchical decoding apparatus is briefly explained according to the flow shown in FIG. 16, as follows. In this case, the processes in steps S81 to S87 are exactly the same as those in the software hierarchical decoding apparatus according to the first variation of the second embodiment.

In the software hierarchical decoding apparatus according to the variation of the fourth embodiment, after it is decided in step S87 whether the input data corresponds to the I frame or not, if the result decides that the input data corresponds to the I frame, the input data, i.e., the high-resolution coded data, is subjected to information expansion (step S88a), and the expanded data obtained by this processing is subjected to resolution conversion to generate low-resolution resolution converted restored data (step S89a), which is different from the first variation of the second embodiment.

Although the case that the hierarchical decoding is carried out by software in the variation of the fourth embodiment, the hierarchical decoding of the variation is not limited to the foregoing case by software. When the decoding unit for the low-resolution coded data and the decoding unit for the high-resolution coded data share a hardware, the similar method of the hierarchical decoding apparatus of the variation, i.e., the time sharing decoding, can be used. In this case, the stream selection means 6a has such a configuration that the coded data corresponding to the I frame of a high-resolution image is extracted from the input multiplexed bit stream, the extracted coded data corresponding to the I frame of an high-resolution image is inserted into the portion of a low-resolution bit stream where the I frame should be positioned, and the low-resolution bit stream including the high-resolution coded data corresponding to the I frame is transmitted to the shared decoding unit.

Further, when the foregoing hierarchical decoding is carried out by software, the user wants to regenerate a high-resolution image with a terminal apparatus, i.e., a computer, which has only a capability of regenerating a low-resolution image. Such a terminal apparatus carries out the regeneration of the high-resolution image in the following way.

Initially, the necessary amount of operation for decoding is determined from information showing the resolution contained in a multiplexed bit stream, the amount of the buffer in decoding, i.e., the amount of coded data to be temporarily retained in decoding, the image size of an I frame, or a bit rate.

As a result of the determination, when the processing performance of the terminal apparatus is decided to be insufficient for the necessary operation, decoding is not carried out for the coded data corresponding to the B frame. In this case, all the coded data corresponding to the B frame are not decoded, but the number of B frames to be subjected to decoding is changed according to the necessary amount of operation for decoding each B frame. Nevertheless, when the decoding of the high-resolution coded data can not be carried out, there is a method such as that the decoding of the coded data corresponding to the P frame is not carried out.

Further, in the hierarchical decoding apparatuses according to the fourth embodiment and the variation, when the low-resolution image is regenerated based on the multiplexed bit stream generated by hierarchical coding, all the high-resolution coded data is not used, but only a portion of the high-resolution data is required to be decoded, whereby even a terminal apparatus capable only of regenerating the low-resolution image can regenerate the low-resolution image while reducing the operational load of decoding to a small size, and can keep the number of frames, which are not subjected to decoding, to a minimum in regenerating the low-resolution image.

It should be noted that although in the fourth embodiment and the variation a signal corresponding to the I frame is selected from the resolution converted signal CITg1 obtained by subjecting the expanded data ITg1 for the high-resolution side to resolution conversion, a resolution converted signal corresponding to the I frame may be obtained by selecting expanded data corresponding to the I frame from the expanded data ITg1 and thereafter subjecting the selected expanded data to resolution conversion.

Further, although the low-resolution coded data that is referred in the processing unit for the high-resolution coded data corresponds to the I frame in the first and second embodiments, the low-resolution coded data that is referred in the processing unit for the high-resolution coded data may correspond to another frame except the I frame, and when the amount of operation of a hardware is tolerable, the coded data corresponding to the P frame may be also referred.

Furthermore, although the high-resolution coded data that is referred in the processing unit for the low-resolution coded data corresponds to the I frame in the third and fourth embodiments, the high-resolution coded data that is referred in the processing unit for the low-resolution coded data may correspond to another frame except the I frame, and when the amount of operation of a hardware is tolerable, the coded data corresponding to the P frame may be also referred.

What is claimed is:

1. A hierarchical image processing apparatus which receives high resolution first coded image data and low-resolution second coded image data as input image data, and subjects both of the coded image data to hierarchical decoding, said apparatus comprising:

first decompressive decoding means for subjecting the first coded image data to frame-by-frame decompressive decoding, and outputting first decoded image signals; and second decompressive decoding means for subjecting the second coded image data to frame-by-frame decompressive decoding, and outputting second decoded image signals; and resolution conversion means for converting the resolution of only an image signal corresponding to an intra-frame coded frame among the second decoded image signals so that the resolution of the image signal becomes equal to the resolution of the first decoded image signals, thereby generating a third decoded image signal;

the first decompressive decoding means performing a decompressive decoding process in which only a third decoded image signal is used as a predictive image signal corresponding to a target frame to be subjected to decompressive decoding when the target frame is an intra-frame coding frame and performing a decompressive decoding process in which only a first decoded image signal is used as a predictive image signal corresponding to the target frame when the target frame is an inter-frame coding frame other than the intra-frame coding frame.

2. A data storage medium storing a program for executing hierarchical decoding by a computer wherein the program makes the computer execute the hierarchical decoding according to the hierarchical image processing apparatus of claim 1.

3. A multiplexing method including a data multiplexing process for multiplexing first coded data obtained by subjecting a first digital image signal having a first resolution to frame-by-frame compressive coding, and a second coded data obtained by subjecting a second digital image signal having a second resolution, which is lower than the first resolution, to frame-by-frame compressive coding, and generating a multiplexed bitstream containing the first and second coded data by the multiplexing process, wherein, said multiplexing process includes:

a packet generation step of dividing the first and second coded data into a plurality of packets as data processing units so that the data corresponding to each frame are transmitted packet by packet, thereby generating a plurality of first packets containing the first coded data corresponding to the respective frames, and a plurality of second packets containing the second coded data corresponding to the respective frames; and a packet arrangement step of arranging the first and second packets in a predetermined order to generate the multiplexed bit stream; and in the packet generation step, a final packet corresponding to each frame is filled with padding data having a predetermined value so that the coded data corresponding to an intra-frame coded frame and the coded data corresponding to an interframe coded frame do not coexist in the same packet, and the head of the coded data corresponding to the intra-frame coded frame is aligned with the head of a data storage position in the packet; and in the packet arrangement step, the first and second packets are arranged so that, at least, first and second packets containing first and second coded data corresponding to the same intra-frame coded frame are arranged adjacent to each other.

4. A hierarchical image processing apparatus which subjects the multiplexed bit stream multiplexed by the hierarchical image processing method of claim 3 to hierarchical decoding, said apparatus comprising:

coded data selection means of selecting coded data necessary for decoding, from the first and second bit stream; and image decoding means for decoding the selected coded data to regenerate image data.

5. A multiplexing method including a data multiplexing process for multiplexing first coded data obtained by subjecting a first digital image signal having a first resolution to frame-by-frame compressive coding, and a second coded data obtained by subjecting a second digital image signal having a second resolution, which is lower than the first resolution, to frame-by-frame compressive coding, and generating a multiplexed bitstream containing the first and second coded data by the multiplexing process, wherein, said multiplexing process includes:

a packet generation step of dividing the first and second coded data corresponding to each frame into a plurality of packets as data processing units different from the frames so that the first and second coded data are transmitted packet by packet, thereby generating first packets containing the first coded data and second packets containing the second coded data so that the coded data corresponding to an intra-frame coded frame and the coded data corresponding to an inter-frame coded frame do not coexist in the same packet; and in the packet generation step, it is judged whether the second coded data to be packetized is intra-frame coded data corresponding to an intra-frame coded frame or not, and an identification flag is added to each of the packets containing the intra-frame coded data among the second coded data, the flag indicating that the second coded data stored in the corresponding packet is intra-frame coded data.

6. A hierarchical image processing apparatus which subjects the multiplexed bitstream multiplexed by the hierarchical image processing method of claim 5 to hierarchical decoding, said apparatus comprising:

coded data selection means for selecting coded data necessary for decoding, from the first and second bitstream; and image decoding means for decoding the selected coded data to regenerate image data.

7. A hierarchical decoding apparatus which receives a multiplexed bitstream containing first coded data obtained by subjecting a first digital image signal having a first resolution to frame-by-frame compressive coding and a second coded data obtained by subjecting a second digital image signal having a second resolution, which is lower than the first resolution, to frame-by-frame compressive coding, and subjects the multiplexed bitstream to frame-by-frame hierarchical decoding, said apparatus comprising:

coded data selection means for selecting first and second coded data from the multiplexed bit stream, and outputting the same;

first image decoding means for subjecting the first coded data outputted from the coded data selection means to frame-by-frame decompressive decoding to output first decoded data corresponding to each frame; and second image decoding means for subjecting the second coded data outputted from the coded data selection means to frame-by-frame decompressive decoding to output second decoded data corresponding to each frame;

wherein, the first image decoding means, when a target frame to be subjected to the decompressive decoding is an intra-frame coded frame, decodes the first coded data using only second decoded data corresponding to the intra-frame coded frame as predictive data corresponding to the target frame, and the first image decoding means, when the target frame to be subjected to the decompressive decoding is an inter-frame coded frame, decodes the first coded data using only first decoded data as predictive data corresponding to the target frame; and the coded data selection means, when decoding the first coded data, supplies the first image decoding means with the first coded data corresponding to all frames included in the multiplexed bitstream, and supplies the second image decoding means with only data corresponding to the intra-frame coded frame, as the second coded data.

* * * * *

UNITED STATES PATENT AND TRADEMARK OFFICE
CERTIFICATE OF CORRECTION

PATENT NO. : 6,393,152 B2
DATED : May 21, 2002
INVENTOR(S) : Takahashi et al.

It is certified that error appears in the above-identified patent and that said Letters Patent is hereby corrected as shown below:

<u>Column 35,</u>
Line 29, change "means of selecting" to -- means for selecting --.

Signed and Sealed this

Twenty-second Day of April, 2003

JAMES E. ROGAN
*Director of the United States Patent and Trademark Office*